United States Patent
Rinaldi et al.

(10) Patent No.: US 10,618,655 B2
(45) Date of Patent: Apr. 14, 2020

(54) PACKAGE DELIVERY MECHANISM IN AN UNMANNED AERIAL VEHICLE

(71) Applicant: Flirtey Holdings, Inc., Reno, NV (US)

(72) Inventors: Joseph Rinaldi, Reno, NV (US); Matthew Sweeny, Reno, NV (US); Tom Bass, Sydney (AU); Jess Hayden, Reno, NV (US); David Hobby, Reno, NV (US); Christopher Galassini, Reno, NV (US); John Johnson, Silver Springs, NV (US); Henri Spaile, Sydney (AU); Seaton Mckeon, Sydney (AU); Justin Wagemakers, Sydney (AU)

(73) Assignee: Flirtey Holdings, Inc., Reno, NV (US)

( * ) Notice: Subject to any disclaimer, the term of this patent is extended or adjusted under 35 U.S.C. 154(b) by 172 days.

(21) Appl. No.: 15/612,789

(22) Filed: Jun. 2, 2017

(65) Prior Publication Data

US 2017/0267347 A1  Sep. 21, 2017

Related U.S. Application Data

(63) Continuation-in-part of application No. 15/294,479, filed on Oct. 14, 2016, now Pat. No. 10,112,721, and
(Continued)

(51) Int. Cl.
*B64D 1/02* (2006.01)
*B64C 39/02* (2006.01)
(Continued)

(52) U.S. Cl.
CPC ............. *B64D 1/02* (2013.01); *B26F 3/12* (2013.01); *B64C 25/58* (2013.01); *B64C 39/024* (2013.01);
(Continued)

(58) Field of Classification Search
CPC ........ B64C 2201/128; B64D 1/12; B64D 1/22
See application file for complete search history.

(56) References Cited

U.S. PATENT DOCUMENTS 4,273,464 A   6/1981  Scott
4,483,563 A   11/1984 Van Der Heyden
(Continued)

FOREIGN PATENT DOCUMENTS

WO       8911415 A1    11/1989
WO    2014/058510 A2    4/2014
WO     2014080409 A1    5/2014

OTHER PUBLICATIONS

International Search report and Written Opinion dated Aug. 31, 2018 for International PCT application No. PCT/US2018/035657.
(Continued)

*Primary Examiner* — Joseph W Sanderson
(74) *Attorney, Agent, or Firm* — EIP US LLP

(57) ABSTRACT

A package delivery mechanism (PDM) of an unmanned aerial vehicle (UAV) is described. The PDM includes a gravity activated locking mechanism to lock and unlock a package attached to the UAV based on the weight of the package. When the package is attached to a suspension member of the UAV, the locking mechanism automatically engages with the package and keeps the package locked to the suspension member, due to the weight of the package. When the package is lowered and reaches the ground, the weight of the package is offloaded from the suspension member, which enables the locking mechanism to be disengaged, thereby releasing the package.

44 Claims, 27 Drawing Sheets

Related U.S. Application Data a continuation-in-part of application No. 15/294,489, filed on Oct. 14, 2016.

(60) Provisional application No. 62/344,535, filed on Jun. 2, 2016, provisional application No. 62/241,572, filed on Oct. 14, 2015, provisional application No. 62/344,514, filed on Jun. 2, 2016.

(51) Int. Cl.

| | | |
|---|---|---|
| B26F 3/12 | (2006.01) | |
| B65D 81/18 | (2006.01) | |
| B65D 81/38 | (2006.01) | |
| B65D 81/02 | (2006.01) | |
| B64D 17/70 | (2006.01) | |
| B64C 25/58 | (2006.01) | |
| B64D 17/80 | (2006.01) | |
| B64D 17/00 | (2006.01) | |
| G01S 19/13 | (2010.01) | |
| B66D 1/60 | (2006.01) | |
| G06Q 50/28 | (2012.01) | |

(52) U.S. Cl.
CPC ............ *B64D 17/70* (2013.01); *B64D 17/80* (2013.01); *B65D 81/022* (2013.01); *B65D 81/18* (2013.01); *B65D 81/3825* (2013.01); *B64C 2201/021* (2013.01); *B64C 2201/024* (2013.01); *B64C 2201/027* (2013.01); *B64C 2201/108* (2013.01); *B64C 2201/128* (2013.01); *B64C 2201/141* (2013.01); *B64C 2201/146* (2013.01); *B64C 2201/185* (2013.01); *B64D 17/00* (2013.01); *B66D 1/60* (2013.01); *G01S 19/13* (2013.01); *G06Q 50/28* (2013.01)

(56) References Cited

U.S. PATENT DOCUMENTS

| | | | |
|---|---|---|---|
| 4,536,024 A * | 8/1985 | Gabriel | B64D 1/22 294/82.24 |
| 5,788,186 A | 8/1998 | White | |
| 6,416,019 B1 | 7/2002 | Hilliard et al. | |
| 6,471,160 B2 | 10/2002 | Grieser et al. | |
| 6,542,797 B2 | 4/2003 | Lohmiller | |
| 6,685,140 B2 | 2/2004 | Carroll | |
| 7,467,762 B1 | 12/2008 | Parsons | |
| 7,487,939 B1 | 2/2009 | Christof et al. | |
| 8,483,891 B2 | 7/2013 | Yakimenko et al. | |
| 8,608,112 B1 | 12/2013 | Levay et al. | |
| 8,979,023 B1 | 3/2015 | Wang | |
| 9,033,281 B1 | 5/2015 | Adams | |
| 9,056,676 B1 | 6/2015 | Wang | |
| 9,145,212 B1 | 9/2015 | Wei et al. | |
| 9,174,733 B1 * | 11/2015 | Burgess | B64D 1/12 |
| 9,551,990 B2 | 1/2017 | Heinonen et al. | |
| 9,561,852 B1 | 2/2017 | Beaman et al. | |
| 9,650,136 B1 | 5/2017 | Haskin et al. | |
| 9,663,234 B1 | 5/2017 | Hanlon | |
| 9,676,481 B1 * | 6/2017 | Buchmueller | B64D 1/12 |
| 9,688,404 B1 | 6/2017 | Buchmeller | |
| 9,738,380 B2 | 8/2017 | Claridge et al. | |
| 9,740,208 B2 | 8/2017 | Sugumaran et al. | |
| 9,874,874 B2 | 1/2018 | Bernhardt et al. | |
| 9,975,651 B1 * | 5/2018 | Eck | B64F 1/32 |
| 10,301,021 B2 * | 5/2019 | Jones | B64C 39/024 |
| 10,324,462 B2 | 6/2019 | Jassowski et al. | |
| 2001/0048050 A1 | 12/2001 | Grieser et al. | |
| 2003/0025038 A1 | 2/2003 | Nicolai et al. | |
| 2003/0057327 A1 | 3/2003 | Carroll et al. | |
| 2005/0006525 A1 | 1/2005 | Byers et al. | |
| 2005/0230555 A1 | 10/2005 | Strong et al. | |
| 2011/0035149 A1 | 2/2011 | McAndrew et al. | |
| 2012/0241553 A1 | 9/2012 | Wilke et al. | |
| 2013/0233964 A1 | 9/2013 | Woodworth et al. | |
| 2013/0311009 A1 | 11/2013 | McAndrew et al. | |
| 2014/0008496 A1 | 1/2014 | Ye et al. | |
| 2014/0105679 A1 | 4/2014 | Oliver | |
| 2015/0094883 A1 | 4/2015 | Patrick et al. | |
| 2015/0115106 A1 | 4/2015 | Coffey et al. | |
| 2015/0158587 A1 * | 6/2015 | Patrick | B64C 39/024 244/137.4 |
| 2015/0254988 A1 | 9/2015 | Wang et al. | |
| 2015/0325064 A1 | 11/2015 | Downey et al. | |
| 2016/0059963 A1 | 3/2016 | Burgess et al. | |
| 2016/0107751 A1 | 4/2016 | Dandrea et al. | |
| 2016/0340049 A1 | 11/2016 | Ferreyra et al. | |
| 2016/0347443 A1 | 12/2016 | Lee | |
| 2016/0347462 A1 | 12/2016 | Clark | |
| 2017/0021925 A1 | 1/2017 | Weller et al. | |
| 2017/0031365 A1 | 2/2017 | Sugumaran et al. | |
| 2017/0081028 A1 * | 3/2017 | Jones | B64C 39/024 |
| 2017/0081029 A1 * | 3/2017 | Jones | B64C 39/024 |
| 2017/0084181 A1 | 3/2017 | Wilson et al. | |
| 2017/0106978 A1 | 4/2017 | Sopper et al. | |
| 2017/0225792 A1 | 8/2017 | Wang | |
| 2017/0267347 A1 | 9/2017 | Rinaldi et al. | |
| 2017/0267348 A1 | 9/2017 | Sweeny et al. | |
| 2017/0276161 A1 | 9/2017 | Oliver | |
| 2017/0328391 A1 | 11/2017 | Matsuda | |
| 2017/0334561 A1 * | 11/2017 | Sopper | B64D 1/22 |
| 2018/0022455 A1 | 1/2018 | McCaslin | |
| 2018/0072421 A1 | 3/2018 | Prager et al. | |
| 2018/0072422 A1 | 3/2018 | Shannon et al. | |
| 2018/0244389 A1 | 8/2018 | Herlocker | |
| 2018/0281954 A1 | 10/2018 | Atchley et al. | |
| 2018/0312247 A1 * | 11/2018 | Ichihara | B64C 27/08 |
| 2019/0054630 A1 | 2/2019 | Lewis | |
| 2019/0066032 A1 | 2/2019 | Taveira et al. | |
| 2019/0072953 A1 | 3/2019 | Meheshwari et al. | |
| 2019/0092468 A1 | 3/2019 | Deutsch | |
| 2019/0100307 A1 | 4/2019 | Beltman et al. | |
| 2019/0202563 A1 | 7/2019 | Wiggerich | |
| 2019/0235494 A1 | 8/2019 | Cantrell et al. | |
| 2019/0258910 A1 | 8/2019 | Stoman | |
| 2019/0291865 A1 | 9/2019 | O'Donnell | |

OTHER PUBLICATIONS

International Search Report and Written Opinion issued in PCT Application No. PCT/US2016/057155 dated Dec. 23, 2016, 16 pages.

International Search Report and Written Opinion issued in PCT Application No. PCT/US2016/057171 dated Dec. 22, 2016, 7 pages.

United States Notice of Allowance dated Jun. 11, 2018 for U.S. Appl. No. 15/294,479.

Final Rejection dated Dec. 27, 2019 for U.S. Appl. No. 15/612,989.

* cited by examiner

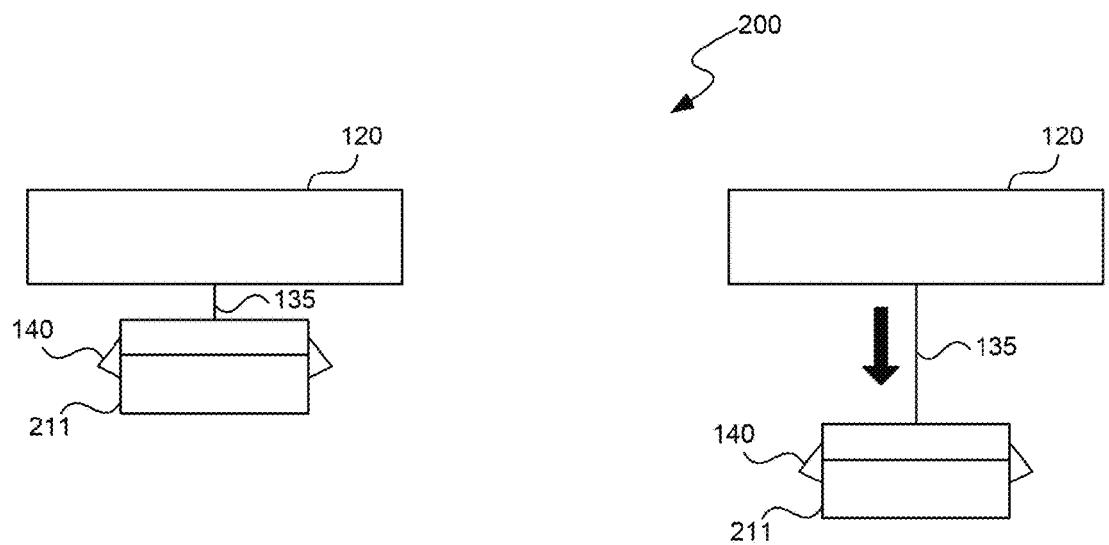
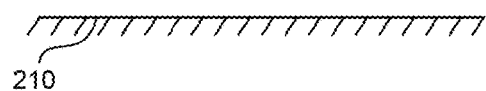
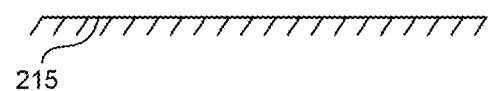
*FIG. 2A*
*FIG. 2B*
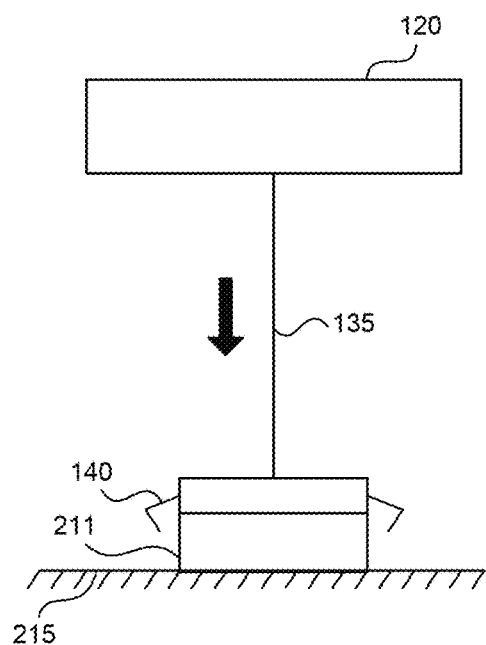
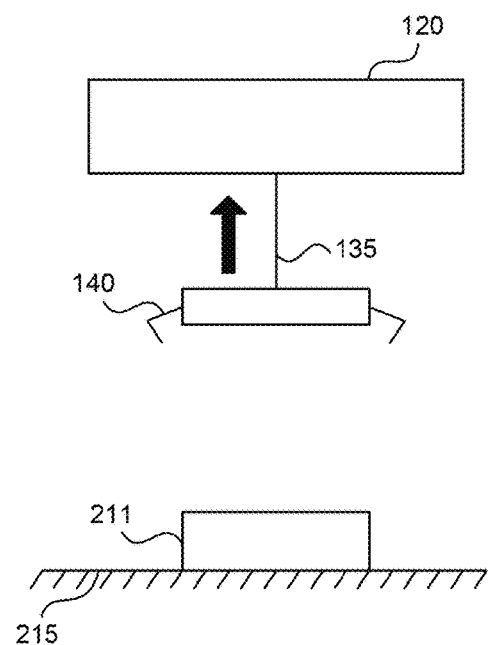
*FIG. 2C*
*FIG. 2D*

PACKAGE DELIVERY MECHANISM IN AN UNMANNED AERIAL VEHICLE

CROSS-REFERENCE TO RELATED APPLICATIONS

This application claims the benefit of U.S. Provisional Application No. 62/344,535, entitled "PACKAGE DELIVERY MECHANISM IN AN UNMANNED AERIAL VEHICLE," filed on Jun. 2, 2016; is a continuation-in-part of U.S. patent application Ser. No. 15/294,489, entitled "PARACHUTE CONTROL SYSTEM FOR AN UNMANNED AERIAL VEHICLE," filed on Oct. 14, 2016, which claims the benefit of U.S. Provisional Application No. 62/241,572, entitled "PARACHUTE DEPLOYMENT SYSTEM FOR AN UNMANNED AERIAL VEHICLE," filed on Oct. 14, 2015 ("'572 provisional application") and U.S. Provisional Application No. 62/344,514, entitled "PARACHUTE DEPLOYMENT SYSTEM FOR AN UNMANNED AERIAL VEHICLE," filed on Jun. 2, 2016 ("'514 provisional application"); and is a continuation-in-part of U.S. patent application Ser. No. 15/294,479, entitled "PARACHUTE DEPLOYMENT SYSTEM FOR AN UNMANNED AERIAL VEHICLE," filed on Oct. 14, 2016, which claims the benefit of the '572 provisional application and the '514 provisional application; all of which are incorporated herein by reference in its entirety.

BACKGROUND

Delivery services, such as a postal service and/or a courier service offered by commercial carriers, provide delivery of goods, e.g., letters, packages, and parcels to recipients, such as residences and businesses across the country. A typical delivery service maintains a large fleet of vehicles, including airplanes and trucks to move packages between mail sorting facilities, and smaller vehicles for moving the packages from the sorting facilities to delivery destinations (for example, a home or business). Such delivery services have some drawbacks and may not be efficient in catering to the needs of the consumers and/or business today. For example, such delivery services involve significant investments in terms of money to procure and maintain the fleet of vehicles, and to manage the human resource required to operate the fleet. Another problem with such delivery services is that they may be incapable of delivering the goods in a short span of time, e.g., in a few minutes or hours from the time the order is placed by the consumer, or even if they can deliver the goods, it can be very expensive for the consumer.

Unmanned aerial vehicle (UAV), such as a drone, has been used to deliver goods. The UAV can deliver goods instantaneously, e.g., within a few minutes or hours from the time the order is placed by the consumer. The UAV delivery service can overcome some of the problems discussed above with respect to the conventional delivery services, however it may still be problematic. To deliver the packages, some UAVs carry the package to a delivery location, and land in the delivery location to drop off the package. A UAV that is powered by a rotor or an impeller may be dangerous to pets or residents at the delivery location.

Some UAVs hover near the destination location at a safe distance from the ground, lower the package from the air onto the ground, e.g., by the means of a cable attached to the UAV, and lower the package on the ground. One problem with such delivery mechanism is that a coupling mechanism of the UAV for holding the package onto the cable and releasing the package from the cable when reaching the ground is very complex. The UAV has to have a separate communication cable running along the cable to which the package is attached, or have some other wireless means to communicate with the coupling mechanism to detach the package from the cable.

Another problem with such delivery mechanism is that when the cable is pulled by a person and/or an animal, or is tangled in an obstacle like a tree, it can bring the UAV down to the ground causing the UAV to be damaged and/or lost. It can also cause injury to the people and/or animals near the UAV. Thus, conventional aerial delivery device methods do not allow for safe, secure delivery of packages to delivery locations.

BRIEF DESCRIPTION OF THE DRAWINGS

FIG. 2A is a diagram illustrating the drone enroute to deliver the package, consistent with various embodiments.

FIG. 2B is a diagram illustrating suspension means of the drone lowering the package from the drone, consistent with various embodiments.

FIG. 2C is a diagram illustrating the suspension means of the drone placing the package on a delivery area at a delivery destination, consistent with various embodiments.

FIG. 2D is a diagram illustrating the drone retracting the suspension means after lowering the package to the surface at the delivery destination, consistent with various embodiments.

DETAILED DESCRIPTION

Figure 1:
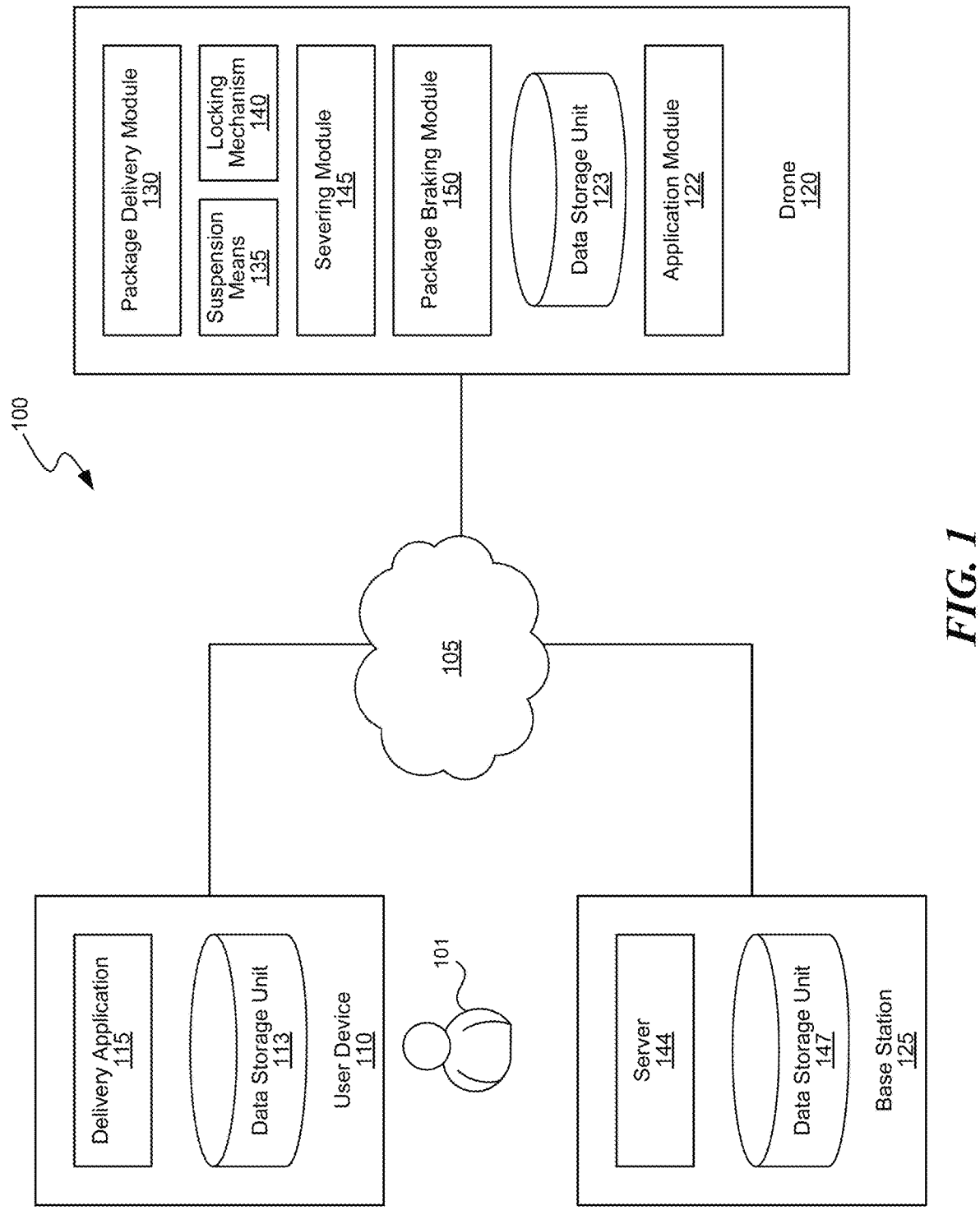
FIG. 1 is a block diagram illustrating a system to deliver a package using a drone, consistent with various embodiments.

Disclosed is a package delivery mechanism of a UAV, such as a drone, to deliver a package at a delivery destination, e.g., a home or a business. When the drone reaches the delivery destination, the package delivery mechanism (also referred to as "package delivery module") lowers the package from the air onto the ground and leaves the package at the delivery destination on a delivery area, e.g., a suitable location of a home such as the front lawn, on the ground somewhere at the delivery destination, a balcony, a porch, or into the hands of a human. In some embodiments, the package can also be lowered into the hands of a receiving person. The drone may not have to land on the ground to deliver the package; it can continue to hover at the delivery destination at a particular height from the ground and lower the package onto the ground. The drone includes a suspension means, e.g., a cable, that lowers the package from the drone onto the ground and deposits the package on the ground. The suspension means can include a locking mechanism that holds or locks the package onto the suspension means until the package is to be deposited at the delivery destination, and unholds or unlocks to release the package when the package is lowered on to the ground and left at the delivery destination.

In some embodiments, the locking mechanism is gravity activated. When a package is coupled to the locking mechanism and lifted off the ground or the surface on which the package is resting, the gravitational force pulls the package down towards the ground due to the weight of the package, which in turn keeps the locking mechanism engaged with the package causing the locking mechanism to lock or hold the package onto the suspension means securely. The locking mechanism continues to be engaged throughout the flight of the drone, e.g., as the gravitational force continues to pull the package down. Upon reaching the delivery destination, the package is lowered to the ground and when the package rests on the ground, the weight of the package is taken off the locking mechanism, which enables the locking mechanism to be decoupled or disengaged from the package, thereby releasing or unlocking the package. The suspension means is then retracted by the package delivery module onto the drone. The gravity activated locking mechanism can eliminate the need to have additional means, e.g., a communication cable that is to be run along the suspension means or a wireless circuitry in the package delivery module, for engaging and/or disengaging the locking mechanism. Also, the gravity activated locking mechanism is significantly simpler, convenient, and cheaper to design, manufacture and use compared to other known means. The locking mechanism can be configured to couple with the package automatically, or passively, which is described in further detail at least with reference to FIG. 2E.

While the locking mechanism is described as gravity-activated, it can work using various other methods, e.g., a remote activated lock; or a timed lock; or a computer vision activated lock; or a weight activated lock; or a humanoid hand holding the package. Further, note that the terms "lock," "hold," "attach," "couple" and such similar terms with reference to the locking mechanism are used synonymously to denote holding of the package by the locking mechanism, with or without locking the package, onto the suspensions means or any other part of the drone securely for carrying the package. Similarly, the terms "unlock," "unhold," "detach," "decouple" and such similar terms with reference to the locking mechanism are used synonymously to denote releasing of the package by the locking mechanism, with or without unlocking the package, from the suspensions means or any other part of the drone to deliver or drop the package at a delivery area.

In some embodiments, the package delivery module also includes a severing module to sever the suspension means from the drone. In some situations, e.g., when the cable that lowers the package is grabbed onto and pulled by a person and/or an animal, or if the cable is tangled in an obstacle like a tree, the drone can be brought down, which can damage the drone, property near the drone, or people and/or animals near the drone. The severing module can sever the suspension means in such situations, which separates the suspension means from the drone thereby keeping the drone from being dragged down. When the cable is grabbed onto and pulled, the package delivery module can detect the additional load on the suspension means. If the load is beyond a specified value, the package delivery module can instruct the severing module to sever the suspension means from the drone, and the severing module severs the suspension means instantaneously, e.g., in a fraction of a second. In some embodiments, the suspension means can be severed automatically by the drone (e.g., whether due to computer vision, onboard sensor indicating a malfunction, or some other input), and/or by a human operator of the drone.

In some embodiments, the severing module uses a nichrome wire for severing the suspension means. When an electric current of certain rating is passed through the nichrome wire, the nichrome wire generates significant heat, which can be used to sever the suspension means. In some embodiments, the severing module uses other cutting instruments to sever the suspension means.

In some embodiments, the drone includes multiple suspension means, e.g., multiple cables. The multiple suspension means can be used to deliver multiple packages, or one cable can be used as a primary cable and another one as a standby cable in case the primary cable ceases to work.

In some embodiments, the drone includes a package brake module that locks the package to the drone and keeps the package from being removed by unauthorized personnel in case there is a problem with the drone, e.g., a power failure in the drone, or if there is a problem with the package delivery module, e.g., suspension means is not working. The package brake module, when engaged, can also take the weight of the package off of the suspension means, thereby reducing the tension on the suspension means and a load on the mechanism, e.g., a motor of a spool or a spindle, using which the suspension means is operated.

FIG. 1 is a block diagram illustrating a system 100 for delivering a package using a drone 120, consistent with various embodiments. The system 100 includes a user device 110, the drone 120, and a base station 125 that are configured to communicate with one another via a network 105. The network 105 can include a local area network ("LAN"), a wide area network ("WAN"), an intranet, an Internet, a cellular or other mobile communication network, Bluetooth, near field communication (NFC), or any combination thereof. The user device 110 can include a desktop computer, a laptop computer, a tablet computer, a smart phone, a wearable device or an automobile with one or more processors embedded therein, or any other wired or wireless, processor-driven device. The user device 110 can be used by a user 101, e.g., a recipient of the package, to track the status of the package delivery made by the drone 120, and/or place an order for a product and request that it be shipped using a drone. The base station 125 can include a server, a desktop computer, a laptop computer, a tablet computer, a smart phone, or any other wired or wireless, or a processor-driven device that can be used by operators of the drone 120 for operating the drone 120 to deliver the package.

In some embodiments, the user 101 may have to install an application, e.g., a delivery application 115, on the user device 110 to access various features provided by the delivery service, including delivery status of the package. In some embodiments, the user 101 may also log into a website provided by the merchant and/or the drone operator to access the above features. The user device 110 can include a data storage unit 113. The data storage unit 113 can store data that may be necessary for the working of the delivery application 115. For example, the data storage unit 113 can store data regarding the delivery status of the package. In another example, the data storage unit 113 can store information such as specific delivery instructions provided by the user to the operators of the drone 120. In some embodiments, the user 101 may access the delivery application 115 on the user device 110 via a user interface. The user 101 can sign in to the delivery application 115 and communicate with the base station 125 to arrange for, modify, or cancel the delivery of a product.

The base station 125 can include a server 144 and a data storage unit 147. The base station 125 can communicate with the user device 110, merchant systems, or other package delivery systems that deliver or receive packages. The base station 125 may be associated with any entity that delivers and/or receives packages. For example, the base station 125 may be associated with a courier company, a shipping company, a postal service, a merchant with whom the user 101 performed a transaction to buy a product that is being delivered, or another party who is operating the drone 120 on behalf of the merchant or the delivery service provider to deliver the product to the user 101.

The drone 120 may be any type of UAV, e.g., a helicopter, a quadcopter, octocopter, or a fixed-wing UAV. The drone 120 includes an application module 122 that facilitates the drone 120 to deliver a package to the user 101. The application module 122 can include the hardware and/or software for working with a package delivery module 130, suspension means 135 and a locking mechanism 140 to deliver the package to the user 101 at a delivery destination. The application module 122 can receive instructions for package deliveries, e.g., from the base station 125. For example, the application module 122 may receive an address of a delivery destination, GPS coordinates of the delivery destination, a smartphone location of the delivery destination, delivery route, package details, or other delivery information, such as delivery area at the delivery destination, which can be a balcony, a porch, front lawn, hands of a human user or on ground somewhere at the delivery destination. The application module 122 may store the received information, and other suitable data to be used for facilitating the delivery of the package in the data storage unit 123. The application module 122 can be configured to determine a delivery route of the drone based on the delivery destination. The application module 122 can be configured to monitor a location of the drone 120 and notify the package delivery module 130 upon reaching the delivery destination or a pickup address, so that the package delivery module 130 can prepare for the drone 120 for picking up or delivering the package 211, e.g., cause the drone 120 to hover at the delivery destination at a particular height from the ground, lower the suspension means to deliver or pick up the package, etc.

A package to be delivered to the user 101 can be attached to the drone 120 using the package delivery module 130. The drone 120 includes a retractable suspension means 135, e.g., a cable, to which the package can be attached. The suspension means 135 can be made of any suitable material, e.g., a metal, a metal alloy, microfilament, a filament, a fiber, or a thread. In some embodiments, the suspension means 135 is made of microfilaments in a braided line. In some embodiments, the suspension means 135 is the same as or similar to a fishing cable wire. In some embodiments, the suspension means 135 is made of a material than can be severed by the application of heat, e.g., within a specified duration. One end of the suspension means 135 is attached to the drone 120 at the package delivery module 130, and another end to a locking mechanism 140 to which the package can be attached. In some embodiments, the retractable suspension means 135 is wound like a coil onto a spindle in the package delivery module 130 though other configurations are possible. The package is attached to the locking mechanism 140, which locks the package to the suspension means 135. After the package is affixed to the drone 120, the base station 125 instructs the drone 120 to fly to the delivery destination. Upon reaching the delivery destination, the drone 120 prepares to release the package on a delivery area at the delivery destination. The drone 120 begins to hover in air at the delivery destination at a particular height from the ground, and the package delivery module 130 instructs the suspension means 135 to lower the attached package from the drone 120 onto the delivery area on the ground. After the package rests on the delivery area, the locking mechanism 140 disengages and releases the package. The package delivery module 130 then retracts the suspension means 135 onto the drone 120.

In some embodiments, the locking mechanism 140 is gravity activated, that is, engages when a gravitational force exerted on the locking mechanism 140 due to the weight of the package is beyond a first specified value, and disengages when the gravitational force on the locking mechanism 140 falls below a second specified value, e.g., when the weight of the package is taken off the locking mechanism 140. In some embodiments, the locking mechanism includes failsafe techniques to ensure that the locking mechanism 140 does not release the package accidentally, e.g., due to a sudden jolt (when a parachute of the drone 120 deploys or a jolt in the wind). In some embodiments, the locking mechanism 140 measures whether the gravitational force on the locking mechanism 140 falls below the second specified value over a period of time. The locking mechanism 140 can be configured to couple with the package automatically, or passively, which is described in further detail at least with reference to FIG. 2E.

The drone 120 also includes a severing module 145 to sever the suspension means 135, e.g., to keep the drone 120 from crashing and causing damages in situations such as when the suspension means 135 is grabbed onto and pulled by a person and/or an animal, or if the cable is tangled in an obstacle like a tree. On severing, the suspension means 135 separates from the drone 120 thereby avoiding the drone 120 from being dragged down. In some embodiments, the package delivery module 130 determines whether to sever the suspension means 135 based on an additional load on the suspension means 135. When the suspension means 135 is pulled, there typically will be an increase in load on the suspension means 135. The package delivery module 130 can detect the additional load on the suspension means 135, and if the total load/weight is beyond a specified value, the package delivery module 130 can instruct the severing module 145 to sever the suspension means 135 from the drone 120. In some embodiments, the severing module 145 includes a nichrome wire for severing the suspension means 135. For example, a portion of the suspension means 135 can be wound with the nichrome wire, and when an electric current of certain rating is passed through the nichrome wire, the nichrome wire generates significant heat around the wire, thereby severing the suspension means 135. In some embodiments, the suspension means 135 is made of a material that can be severed using heat. In some embodiments, the severing module uses other cutting instruments to sever the suspension means 135, which may or may not use application of heat.

The drone 120 includes a package brake module 150 that locks the package to the drone 120 and keeps the package from being removed by unauthorized personnel in case there is a problem with the drone 120, e.g., a power failure in the drone 120, or with the package delivery module 130, e.g., suspension means 135 is not working.

Note that the drone 120 illustrated in FIG. 1 is not restricted to having the above modules. The drone 120 can include lesser number of modules, e.g., functionalities of two modules can be combined into one module. The drone 120 can also include more number of modules, e.g., functionalities performed by a single module can be performed by more than one module, or there can be additional modules that perform other functionalities. The functionality performed by a module described above can be performed by one or more of the other modules as well. Further, the drone 120 can include other modules for performing, or the application module 122 can be further configured to perform other functions including: controlling the drone 120 in flight; detecting errors in operation of the drone 120; deploying a parachute to decelerate the descent of the drone 120; providing power supply to the drone 120; steering the drone 120; disabling the motors of the drone 120; navigating the drone 120, including providing route information or adjusting the route information dynamically; navigating the drone 120 using auto-pilot; capturing an image, an audio clip, and/or a video clip of various targets from the drone 120; preventing unauthorized interference with the command and control of the drone 120; and deploying an airbag to minimize a damage that can be caused to the drone 120 in case of a crash.

The drone 120 can be deployed to perform one or more applications, e.g., surveillance of illegal activities to safeguard civil security, anti-poacher operations, forest fire fighting, monitoring flooding storms & hurricanes, traffic monitoring, radiation measurement, searching for missing persons, monitoring harvesting. The application module 122 can be configured to perform a specified user-defined application.

Figure 2E:
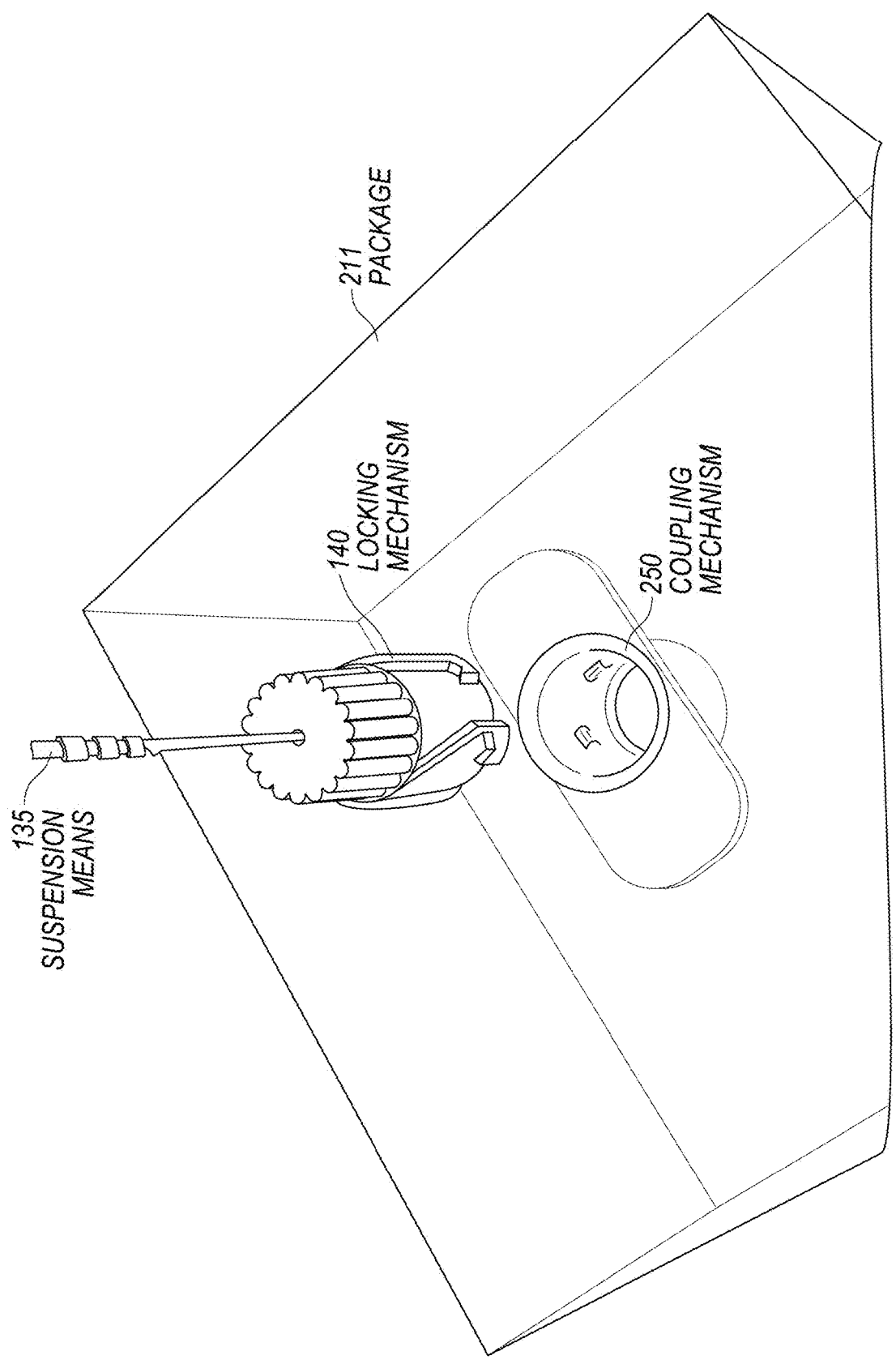
FIG. 2E is a diagram illustrating an example of the locking mechanism of FIG. 1, consistent with various embodiments.

FIGS. 2A-2E, collectively referred to as FIG. 2, is a diagram illustrating an example 200 of using a gravity activated locking mechanism in delivering packages using a drone, consistent with various embodiments. The example 200 can be implemented in the system 100 of FIG. 1 and using the drone 120. As illustrated in FIG. 2A, the drone 120 is in flight enroute to a delivery destination to deliver a package 211. The drone 120 is flying at a particular height from the ground 210. The package 211 is attached to the drone 120 via the suspension means 135. The package 211 is locked to the suspension means 135 via the locking mechanism 140. In some embodiments, the locking mechanism 140 can be gravity activated. The gravitational force exerted on the locking mechanism 140 due to the weight of the package 211 engages the locking mechanism 140 causing the package 211 to be locked to the suspension means 135. In some embodiments, the package 211 includes a coupling mechanism 250 that holds the package 211 onto the locking mechanism 140 when the locking mechanism 140 is engaged.

The package 211 is loaded onto the drone 120 such that the package 211 rests in a hood (described below at least with reference to FIGS. 11A, 11B, 13), flush against the top and all four sides of the hood. After the package 211 is raised enough by the suspension means 135, e.g., the package 211 is flush in the hood, a spool brake (e.g., the package brake module 150) is automatically engaged to prevent the suspension means 135 from lowering during the flight and therefore, prevent the package 211 from lowering. The package 211 is now secure, e.g., locked in place and may not rotate or shift due to protection from the package hood, cannot be lowered because of the spool brake, and cannot separate from the suspension means 135 because it cannot unlock itself off of the gravity activated male coupler 140 because it is flush against the top of the package hood.

Figure 13:
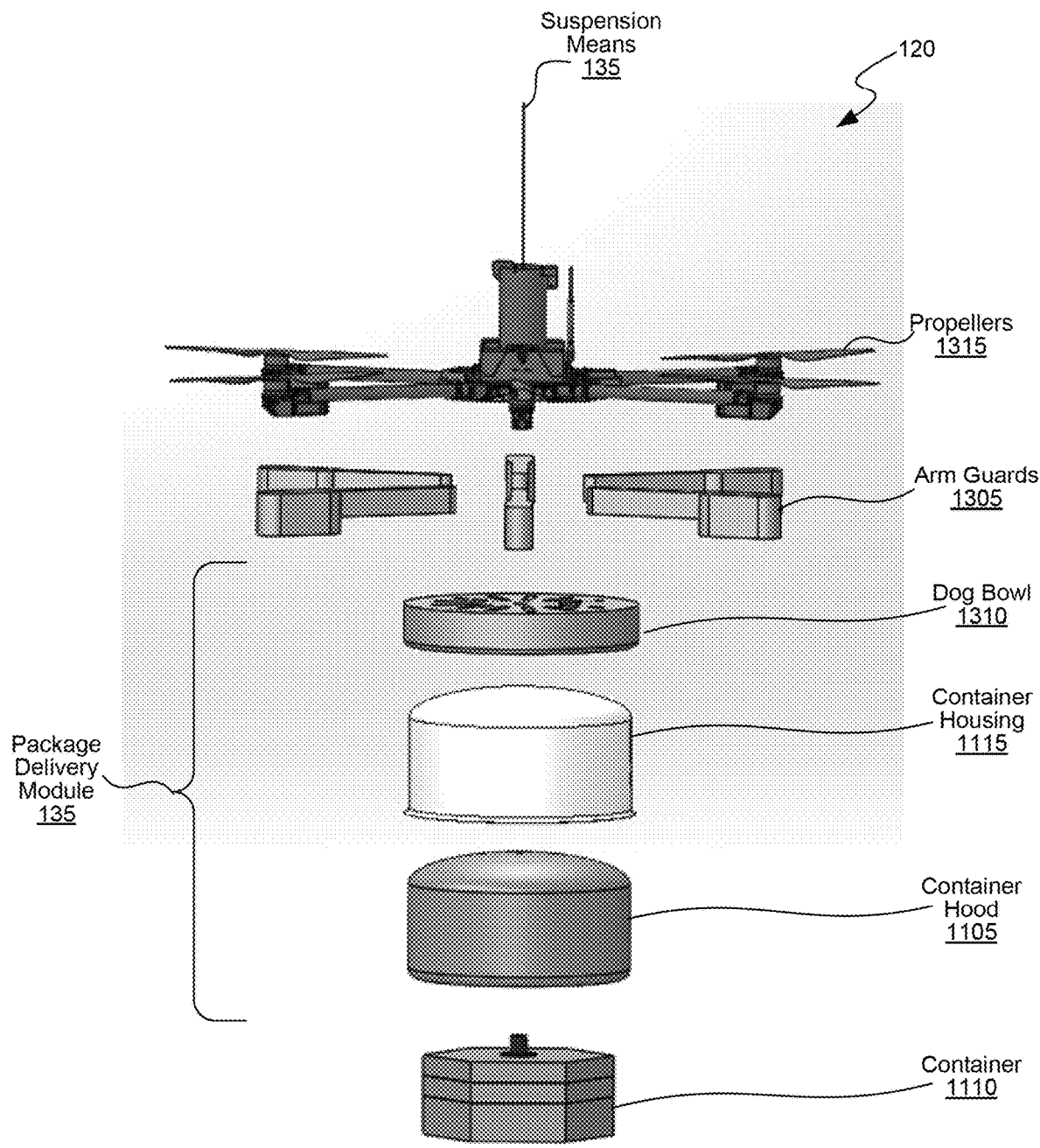
FIG. 13 is a diagram of the drone with various parts of the package delivery mechanism, consistent with various embodiments.
Figure 14:
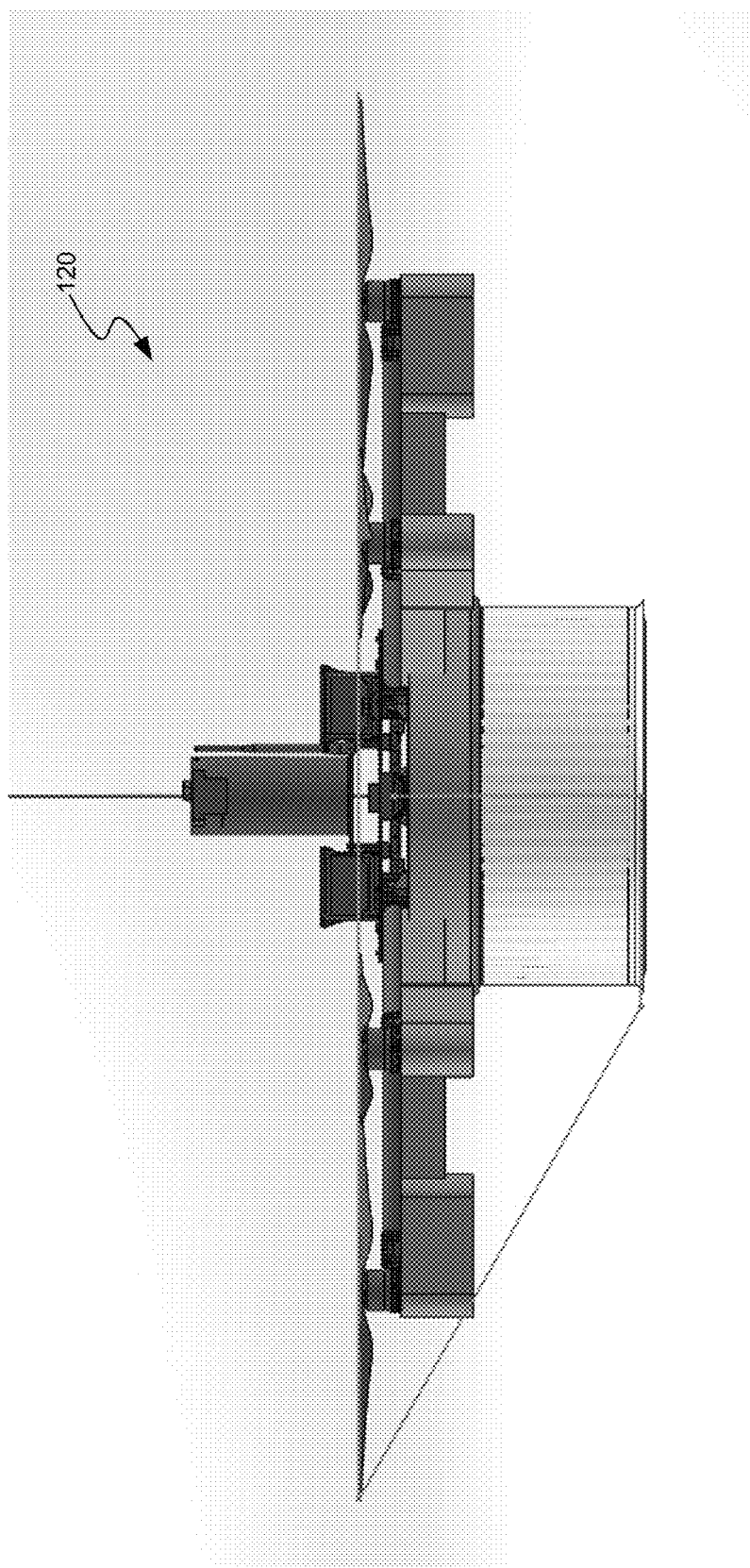
FIG. 14 is a diagram of the drone with the container housing, consistent with various embodiments.
Figure 17A:
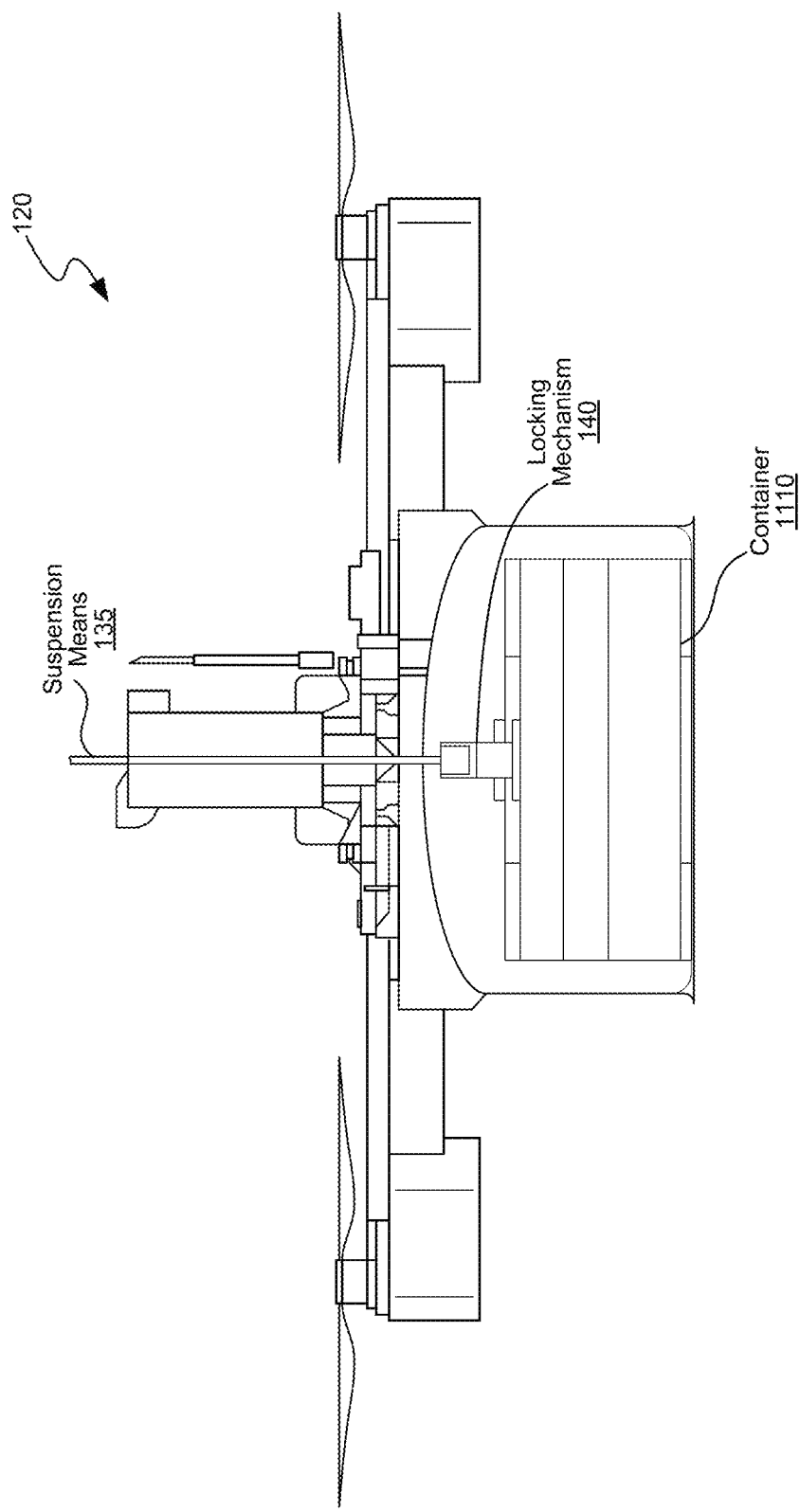
FIG. 17A is a diagram illustrating the drone en route to deliver the package, consistent with various embodiments.

In some embodiments, the package 211 is loaded in the center of and underneath the airframe of the drone 120 (e.g., as illustrated in FIGS. 13, 14, and 17A below). Such a mounting can improve the natural stability of the payload by lowering the center of gravity temporarily, until the package 211 is delivered.

Upon reaching the delivery destination, the drone 120 prepares to deliver the package 211 at a delivery area 215 in the delivery destination. The delivery area can be any designated area in the delivery destination, e.g., a balcony of a house, a front lawn, a porch, an entrance of a business, a patio table in the front lawn. As illustrated in FIG. 2B, the drone 120 hovers in air above the delivery area 215 at a particular height from the ground, releases the spool brake and lowers the suspension means 135 to deliver the package 211 in the delivery area 215. The drone 120 continues to lower the suspension means 135 until the package 211 rests on the delivery area 215. The locking mechanism 140 is still engaged while the package 211 is being lowered as the weight of the package 211 keeps the locking mechanism 140 engaged. In some embodiments, a pilot of the drone 120 has the ability to stop the descent of the package 211 if the safety of the delivery location is compromised.

In some embodiments, one of the factors considered in determining the particular height at which the drone 120 should hover for delivery is a minimum parachute deployment height. The minimum parachute deployment height is the minimum height from the ground at which the drone 120 is required hover if the parachute is to be deployed. If the hovering height of the drone 120 is less than the minimum parachute deployment height then the parachute may not be deployed. This can be dangerous because if the drone 120 crashes and the parachute is not able to be deployed, it can cause an injury to a human being or a property in the surrounding. Accordingly, the particular height at which the drone 120 has to hover for delivering a package is computed as a function of the minimum parachute deployment height. For example, if the minimum parachute deployment height is 4 meters, then the drone 120 is configured to hover and deliver from a height of 4 meters plus height of a person plus margin of error to ensure safety for the recipient on the ground. If the minimum parachute deployment height changes, the minimum delivery height also changes accordingly.

As illustrated in FIG. 2C, when the package 211 rests on the delivery area 215, the locking mechanism 140 can be disengaged to release the package 211. When the package 211 rests on the delivery area 215, the weight of the package 211 is offloaded from locking mechanism 140 resulting in the gravitational force exerted on the locking mechanism 140 to drop below a specified value, which enables the locking mechanism to be disengaged from the package 211, thereby releasing the package 211.

After the package 211 is lowered in the delivery area 215 and released from the locking mechanism 140, the drone 120 retracts the suspension means 135, as illustrated in FIG. 2D. For example, the package delivery module 130 senses the reduction of weight on the suspension means 135, determines the package 211 is delivered onto the delivery area 215 and retracts the suspension means 135 back onto the line spool. In some embodiments, if the suspension means 135 becomes entangled, the operator or the package delivery module 130 can command the severing module 145 to cut the suspension means 135 and separate it from the drone 120.

FIG. 2E is a diagram illustrating an example of the locking mechanism of FIG. 1, consistent with various embodiments. The locking mechanism 140 attached to the suspension means 135 can be a male coupler, and the coupling mechanism 250 on the package 211 to which the locking mechanism 140 engages can be a female coupler, though various other configurations of the locking mechanism 140 and the coupling mechanism 250 are possible. The suspension means 135 can be a microfilament braided line and can be rated to handle a specified weight, e.g., up to 100 lbs. The locking mechanism 140 can operate as described with reference to FIGS. 2A-2D. For example, during package loading, the suspension means 135 is lowered to insert the male coupler 140 into the female coupler 250 that is installed in the package 211. The male coupler 140 is rotated clockwise in the female coupler 250, which locks the male and female couplers together. As long as the weight of the package 211 remains on the male coupler 140, the package 211 will remain attached to the male coupler 140 and therefore, to the suspension means 135.

The locking mechanism 140 can operate in automatic-coupling mode or a passive-coupling mode to lock and/or unlock the package 211. For example, in the automatic-coupling mode, the locking mechanism 140 automatically couples the male and female couplers, e.g., rotates the male coupler 140 in the female coupler 250 after inserting the male coupler 140 into the female coupler 250, to hold the male and female couplers together in locked position so that when the package 211 is lifted off the surface it's resting on, the package 211 locks onto the suspension means 135, e.g., due to its weight. Similarly, when the package 211 is to be delivered at the delivery area 215, the package delivery module 130 lowers the suspension means 135 to the delivery area 215 and once the package 211 rests on the delivery area 215, the weight of the package 211 will be off the suspension means 135 and the package delivery module 130 automatically disengages the male and female couplers, e.g., rotates the male coupler 140 in a direction opposite to that of the locking, to unlock the male coupler 140 from the female coupler 250 thereby releasing the package 211. The package delivery module 130 then retracts the suspension means 135 onto the drone 120. The locking mechanism 140 can be automatically engaged in various ways. For example, the suspension means 135 can have a mechanism to automatically rotate the male coupler 140, or the package delivery module 130 can rotate the suspension means 135 to rotate the male coupler 140. In another example, a package loading equipment, e.g., in the loading facility associated with the base station 125 that automatically loads the package 211 to the drone 120 can have a mechanism to rotate the male coupler 140.

In a passive-coupling mode of the locking mechanism 140, while the package delivery module 130 performs most of the operations performed in the automatic configuration described above, e.g., lowering or retracting the suspension means 135, one or more of the operations may be performed by a human user to lock or unlock the package 211, such as manually rotate the male coupler 140 in the female coupler 250 to lock or unlock the package 211.

Note that the shape, size and any other configuration of the locking mechanism 140, the male and female couplers (or the drone 120 or any other part of the drone 120) illustrated in the figure is for illustration purposes only. The actual shape, size and other configurations can be different from what is illustrated in FIG. 2. For example, the locking mechanism 140 can have male and female couplers that engage or disengage themselves in a way other than rotating. In another example, the locking mechanism 140 can operate using a technique other than gravity.

Figure 3B:
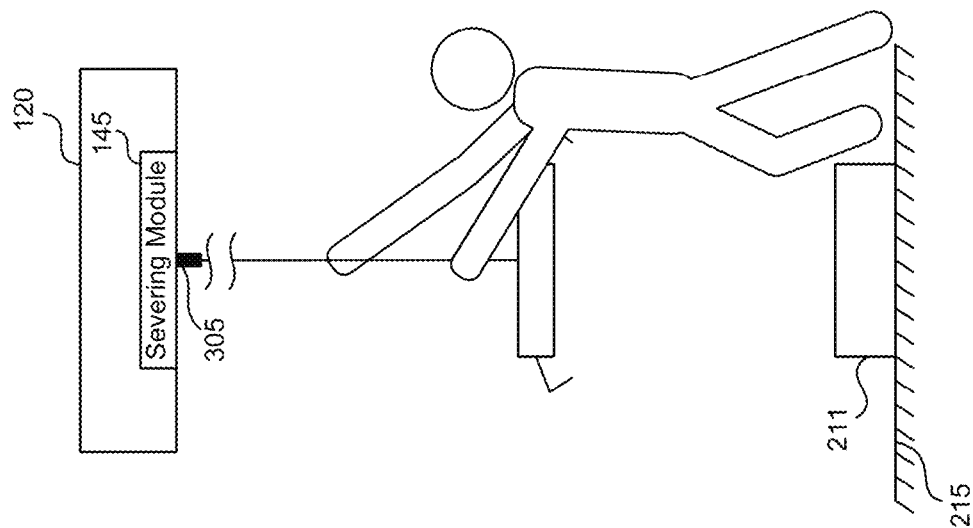
FIG. 3B is a diagram of an example for severing the suspension means of the drone, consistent with various embodiments.
Figure 3A:
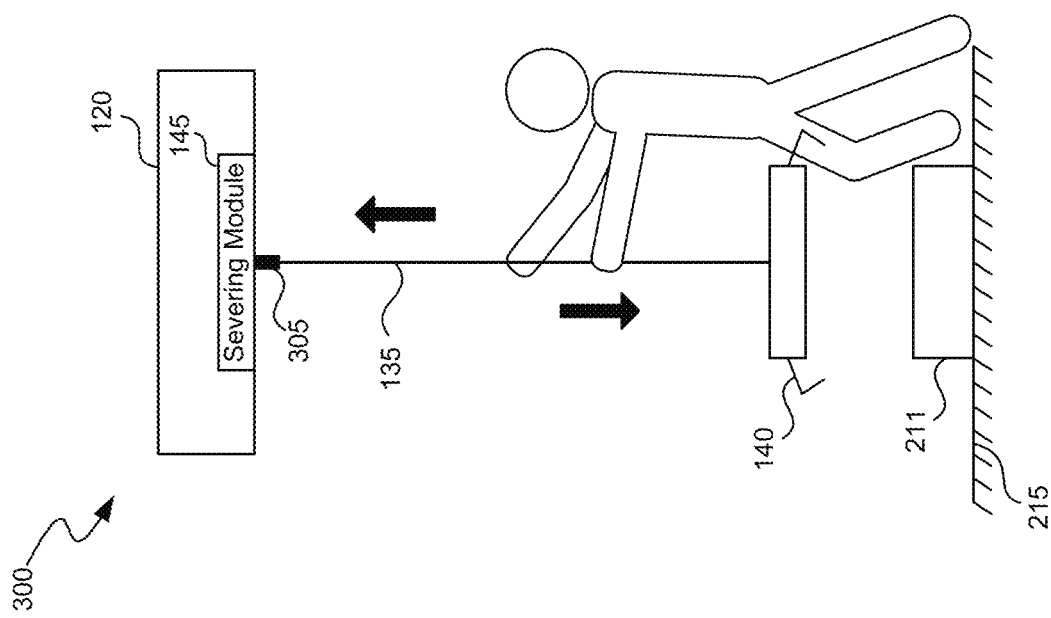
FIG. 3A is a diagram of an example for severing the suspension means of the drone, consistent with various embodiments.

FIGS. 3A and 3B, collectively, referred to as FIG. 3, is a diagram of an example 300 for severing suspension means of a drone, consistent with various embodiments. In some embodiments, the example 300 is implemented in the system 100 of FIG. 1 and using the drone 120. As illustrated in FIG. 3A, after the package 211 is released at the delivery area 215, the drone 120 retracts the suspension means 135. When the suspension means 135 is pulled, e.g., when pulled by an animal or a person, such as a person 310, or when stuck in other objects, such as a tree, either when the suspension means 135 is being retracted or being lowered to deliver the package 211, the drone 120 can be dragged to the ground and crash, injure the person 310 and/or damage the property around the drone 120. Further, the drone 120 can be damaged or stolen.

When the suspension means 135 is pulled, the severing module 145 detects an additional load on the suspension means 135 and if the load is beyond a specified value, the severing module 145 severs the suspension means 135, as illustrated in FIG. 3B. In some embodiments, the severing module 145 includes a nichrome wire 305 that is used to sever the suspension means 135. The nichrome wire 305 can be wound around a particular portion of the suspension means 135 as illustrated in FIG. 3A. When the suspension means 135 has to be severed, the severing module passes an electric current of a certain rating through the nichrome wire 305, which generates a significant amount of heat causing the suspension means 135 to be severed at the portion where the nichrome wire 305 is in contact with the suspension means 135. Severing the suspension means 135 when the suspension means 135 is pulled or when the suspension means 135 is entangled in an obstacle will keep the drone 120 from crashing, being stolen, and/or causing damage to any person, animal or property in the surroundings.

Note that the shape, size and any other configuration of the severing module 145 or the nichrome wire 305 illustrated in the figure are for illustration purposes only. The actual shape, size and the configuration can be different from what is illustrated in FIG. 3. Further, in other embodiments, means other than nichrome wire 305 can be used for severing the suspension means 135.

Figure 4:
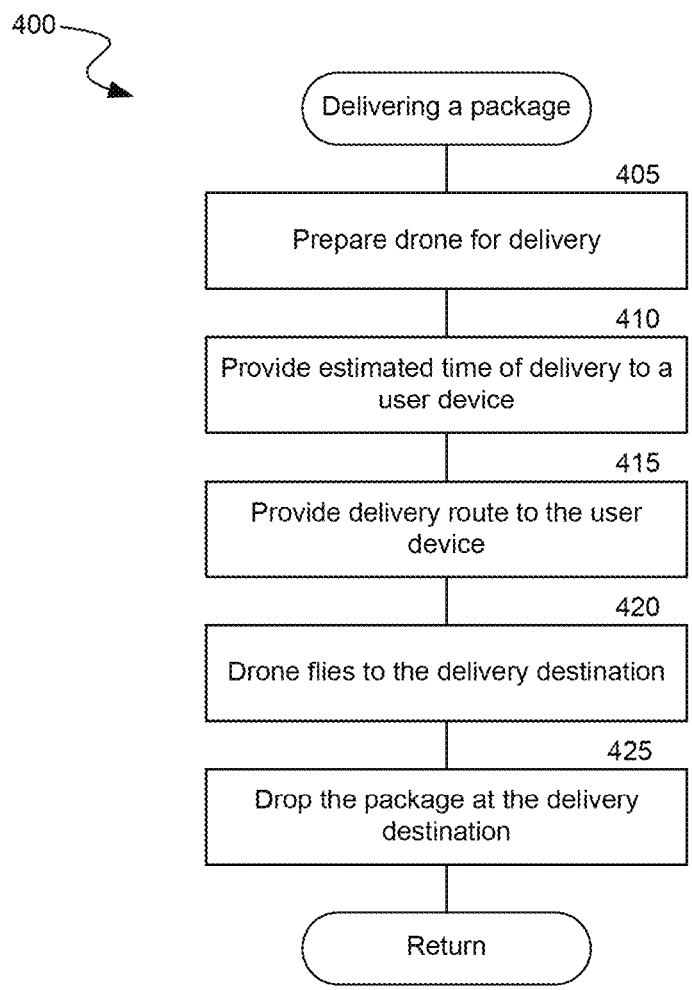
FIG. 4 is a flow diagram of a process for delivering the package using a drone, consistent with various embodiments.

FIG. 4 is a flow diagram of a process 400 for delivering a package using a drone, consistent with various embodiments. The process 400 can be performed in the system 100 and using the drone 120 of FIG. 1. At block 405, the base station 125 prepares the drone 120 for delivering a package, e.g., package 211 of FIG. 2, to a user, e.g., the user 101. The package 211 may be any product for delivery to the user 101, a merchant or other recipient. Additional details regarding preparing the drone 120 for delivering the package 211 is described at least with reference to FIG. 5 below.

At block 410, the base station 125 provides an estimated time of delivery to the user 101. The delivery time may be transmitted to the user device 110 by the base station 125, a merchant system, or other entity. The user device 110 may display the estimated delivery time to the user 101 via the user interface of the delivery application 115. In some embodiments, the estimated delivery time is decided by the operator of the drone 120, the merchant with whom the user 101 placed the order for the product, and/or the user 101.

At block 415, the base station 125 provides a delivery route taken by the drone 120 to the user device 110.

At block 420, the drone 120 transports the package 211 to the address associated with the delivery destination. The drone 120 may proceed to the address associated with the user 101. For example, the drone 120 may fly to the address via a predetermined route. The drone 120 may follow a route provided by a routing program to reach the destination address of the user 101. In another example, the drone 120 may navigate via a global positioning system ("GPS") technology to the destination address of the user 101. The determination of the route can be based on various factors, e.g., route data received from the merchant, route data determined by the operator of the drone 120, route data determined based on local or national regulations, and route data determined based on weather data.

In some embodiments, the user 101 can view the estimated time of delivery and/or the delivery route, track the real-time delivery status, and/or a current location of the drone 120 using the delivery application 115 installed on the user device 110. Alternatively, the user 101 may also log into a website provided by the merchant and/or the drone operator to view the above data.

After the drone 120 reaches the delivery destination, at block 425, the drone 120 delivers the package 211 at the delivery address, e.g., at a designated delivery area in the delivery address. In some embodiments, the drone 120 delivers the package 211 at the delivery destination at least as described with reference to FIGS. 2A-2E.

Figure 5:
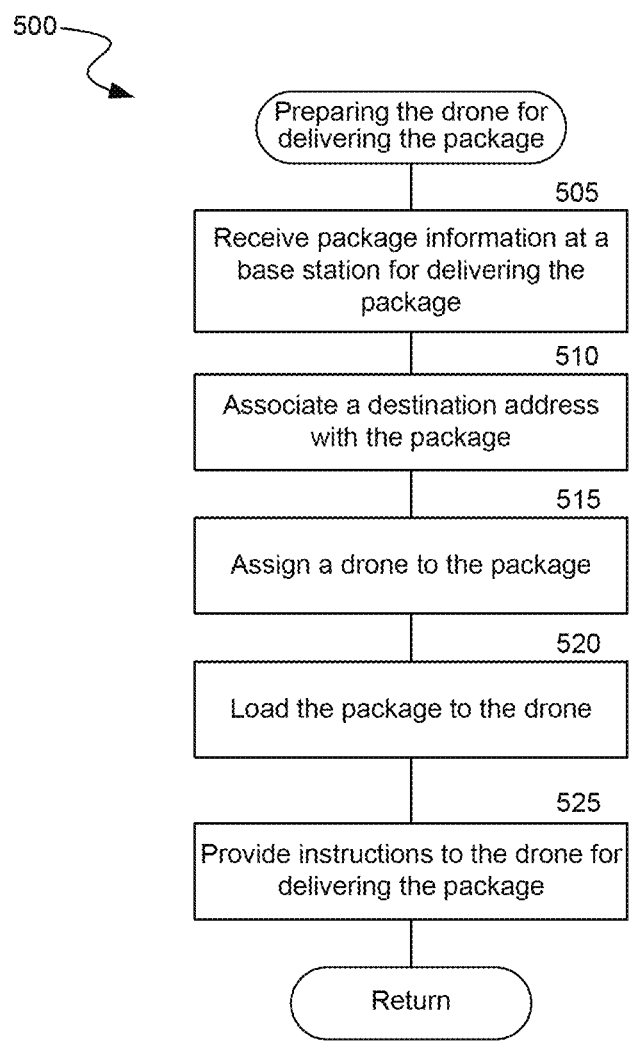
FIG. 5 is a flow diagram of a process for preparing a drone for delivering the package, consistent with various embodiments.

FIG. 5 is a flow diagram of a process 500 for preparing a drone for delivering a package, consistent with various embodiments. The process 500 can be performed in the system 100 and using the drone 120 of FIG. 1. In some embodiments, the process 500 can be performed as part of block 405 of the process 400. At block 505, the base station 125 receives information of the package 211 for delivery. The package 211 for delivery arrives at a loading facility associated with the base station 125 with appropriate delivery information for delivery to the user 101. The information may include a name of the user 101, a delivery address for the user 101, a confirmation number, a sender name and address, and other identifying information for the recipient, sender, origin location, and/or delivery location, merchant identification information of the merchant from whom the product to be carried I the package 211 is purchased, etc.

The delivery information may be provided by the sender of the package or by the user 101. For example, the sender or the user 101 may enter the delivery information into the server 144 of the base station 125. In another example, the sender or the user 101 may enter the delivery information into a delivery application 115 or in any suitable manner input delivery instructions that are communicated to the base station 125.

At block 510, the base station 125 associates a destination address with the package 211, e.g., based on the delivery information obtained in the block 505. The delivery address is stored with identification of the package 211 in the data storage unit 147 of the base station 125.

At block 515, the base station 125 associates or assigns the package 211 to a drone. The base station 125 may identify a drone 120 among a number of drones that is to be associated with the package 211. For example, the base station 125 may identify a drone that is available for delivery, e.g., one that is not already assigned to another delivery, one that has enough battery power to complete the delivery for the specified address, etc. The base station 125 can assign certain type of drones to certain type of deliveries. For example, the operator may use a first type of drone for deliveries in a first geographical region and a second type of drone for deliveries in a second geographical region. In another example, the operator may use different types of drones for delivering packages of different types, shapes, sizes or weights. In another example, the package 211 is associated with the drone 120 on a random basis.

At block 520, the package 211 is loaded onto the drone 120 for delivery. In some embodiments, loading the package 211 onto the drone 120 includes locking the package 211 to the suspension means 135 of the drone 120, which is described in further detail at least with reference to FIG. 6.

The package 211 maybe loaded to the drone 120 using an automated packaging process. Alternatively, the package 211 maybe loaded manually by an operator at a facility associated with the base station 125 or elsewhere. In some embodiments, the automated packaging process includes assigning the package to one of a number of drones in a loading facility associated with the base station 125. The drones can be parked at their assigned drone ports or stations in the loading facility. The base station 125 can select a particular drone and assign the package to the selected drone. The automatic packaging process can then automatically carry the package to the station of the selected drone, e.g., via a conveyor belt, and load the package onto the selected drone. In another example, a package can be loaded onto the drone 120 by instructing the drone 120 to pick up the package from a specified address. The drone 120 can fly to the specified address and pick up the package, e.g., as described in further detail below.

At block 525, the base station 125 provides the instructions for delivery of the package 211 to the drone 120, and the process 500 returns, e.g., to process 400. The instructions can include the delivery destination address, the delivery route, etc. In some embodiments, the instructions are delivered to the drone 120 via the network 105. For example, an operator of the drone 120 may instruct the server 144 to deliver the instructions to the drone 120, or the operator may enter the instructions directly into a user interface of the drone 120. The drone 120 can store the instructions in the data storage unit 123.

In some embodiments, the drone 120 is also used to pick up a package in addition to, or instead of, delivering the package. For example, consider that a user 101 places an order for an item from a vendor store, such as for delivery of a pizza with a particular restaurant. The drone 120 can pick up the pizza from the restaurant and deliver the pizza at the delivery address provided by the user 101. The processes 400 and 500 can be extended to perform the pickup of the package 211 as well. For example, once the user 101 places an order with the restaurant, the restaurant would provide instructions to the base station 125 for picking up the package 211 at the restaurant and delivering it at the delivery address. The instructions can include the pickup address of the package 211, drop-off address of the package 211, order number, etc. The base station 125 can then program the drone 120 to pick up the package 211 from the pickup address and deliver the package 211 at the drop-off address directly from the pickup address or via the base station 125.

After sending the drone 120 to the pickup address, the base station 125 can send a notification to the vendor store indicating that the drone 120 is on the way to pick up the package 211. The vendor store can have a computing device, e.g., similar to the user device 110, using which the arrival status of the drone 120 can be tracked. When the drone 120 arrives at the pickup address, the vendor store can be notified, e.g., via a text message to a mobile device or some other means, to indicate that the drone 120 has arrived at the pickup location and is standing by for the pickup. Once the vendor store responds to the notification, the drone 120 lowers the suspension means 135 for the package to be loaded onto the drone 120. After the package is loaded onto the drone 120, the drone 120 can then be instructed to proceed further for the delivery. The drone 120 retracts the suspension means 135 and then be on its way to deliver the package 211 at the drop-off location. Various other processes can be used to facilitate the pickup in which at least some of the above steps can be modified, omitted or other steps can be added. In some embodiments, the drone 120 can pick up the package automatically, e.g., without waiting for the vendor to confirm the pickup. For example, after reaching the pickup location, the drone 120 can determine the presence of the package at a pickup area at the pickup address, such as a front lawn at the pickup location, using, using the onboard camera or other sensors, and proceed to pick up the package.

Figure 6:
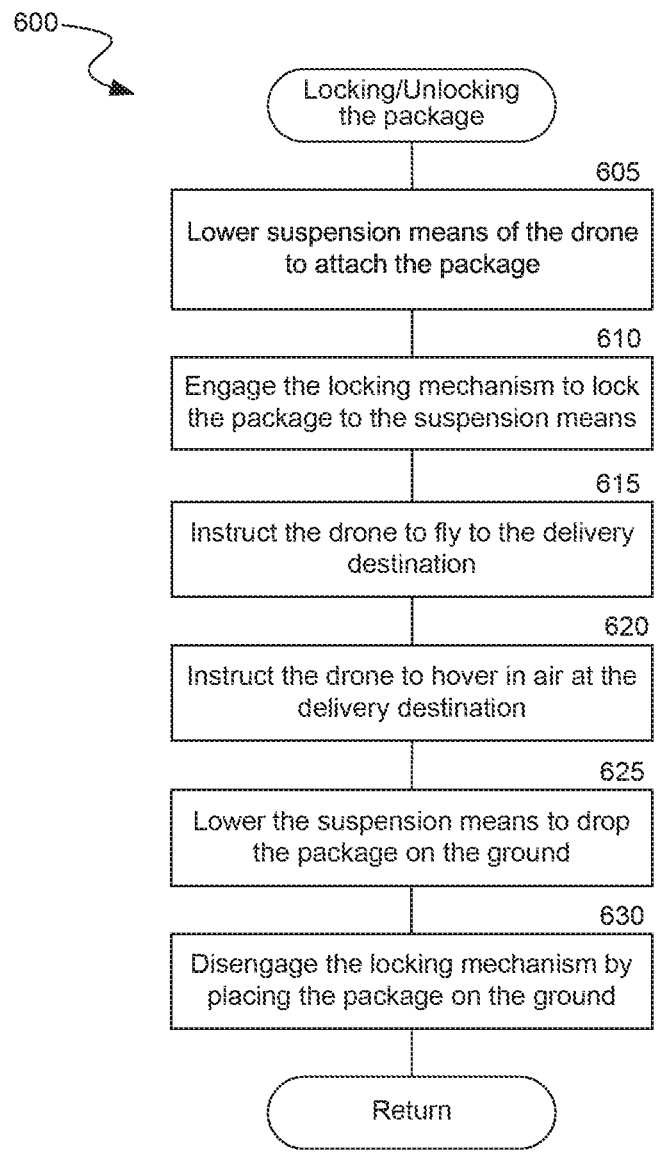
FIG. 6 is a flow diagram of a process for locking the package to and unlocking the package from the suspension means of the drone using a locking mechanism, consistent with various embodiments.

FIG. 6 is a flow diagram a process 600 for locking and unlocking the package attached to the suspension means of the drone using a locking mechanism, consistent with various embodiments. The process 600 can be performed in the system 100 and using the drone 120 of FIG. 1. In some embodiments, the process of locking the package is performed when the package is picked up, and the process of unlocking is performed when the package is dropped off. The process 600 can be performed as part of process 400 and/or 500. At block 605, the package delivery module 130 of the drone 120 lowers the suspension means 135 to pick-up a package, such as package 211, from a pick-up address or from the loading facility of the base station 125. In some embodiments, the package delivery module 130 lowers the suspension means until the locking mechanism 140 is in a position to be attached or coupled to the package 211. For example, the package delivery module 130 lowers the suspension means 135 until the male coupler 140 of the suspension means 135 is inserted into the female coupler 250 of the package 211. The package delivery module 130 can determine whether the locking mechanism 140 is in a position to be attached to the package 211 in various ways. For example, when the male coupler 140 is inserted into and rests in the female coupler 250, the weight of the male coupler 140 is off the suspension means 135 and the package delivery module 130 can determine that male coupler 140 is in position to be attached to the female coupler 250. In another example, the package delivery module 130 can determine the distance between the drone 120 and the package 211, e.g., using various on-board sensors, and lower the suspension means 135 based on the determined distance. In yet another example, the lowering of the suspension means 135 can be controlled by an operator of the drone 120.

At block 610, the locking mechanism 140 is engaged with the package 211 to lock the package 211 to the suspension means 135. The locking mechanism 140 can be operated, e.g., engaged and disengaged, in an automatic-coupling mode or a passive-coupling mode to lock or unlock the package, e.g., as described at least with reference to FIG. 2E. Once the locking mechanism 140 is attached to the package 211 and the drone 120 is airborne, the locking mechanism 140 continues to be engaged, e.g., due the weight of the package 211 on the locking mechanism 140 exerted by the gravitational force, causing the package 211 to be locked to the suspension means 135. In some embodiments, the locking mechanism 140 is configured to engage only if the weight of the package 211 is exceeds a first specified value.

At block 615, the drone 120 flies to the delivery destination where the package has to be delivered.

At block 620, upon reaching the delivery destination, the application module 122 instructs the drone 120 to hover at the delivery destination at a particular height from the ground and instructs the package delivery module 130 to prepare for delivering the package 211.

At block 625, the package delivery module 130 lowers the suspension means 135 to deliver the package at a delivery area in the delivery destination, e.g., delivery area 215. The package delivery module 130 continues to lower the suspension means 135 until the package 211 rests on the delivery area 215. The locking mechanism 140 is still engaged while the package 211 is being lowered as the weight of the package 211 keeps the locking mechanism 140 engaged.

At block 630, when the package 211 rests on the delivery area 215, the weight of the package 211 is offloaded from the locking mechanism 140. When the weight is offloaded, and the weight on the locking mechanism 140 drops below a second specified value enabling the locking mechanism 140 to be disengaged, thereby releasing the package 211.

In some embodiments, the speed at which the suspension means 135 is lowered from the drone 120 or retracted into the drone 120, e.g., in blocks 605 and/or 625, can be regulated. For example, the rate of descent of the suspension means 135 is decelerated as the package 211 reaches the ground or the surface on which the package 211 is to be delivered, e.g., in order to avoid any damage to the package 211 from the impact of the delivery. In another example, the speed at which the suspension means 135 is retracted into the drone is decreased as the package 211 or the locking mechanism 140 reaches the drone 120, e.g., in order to avoid the package 211 or the locking mechanism 140 (when there is no package attached to the suspension means 135) from being retracted too forcefully into the drone 120 and harm the spool of the suspension means 135.

Figure 7:
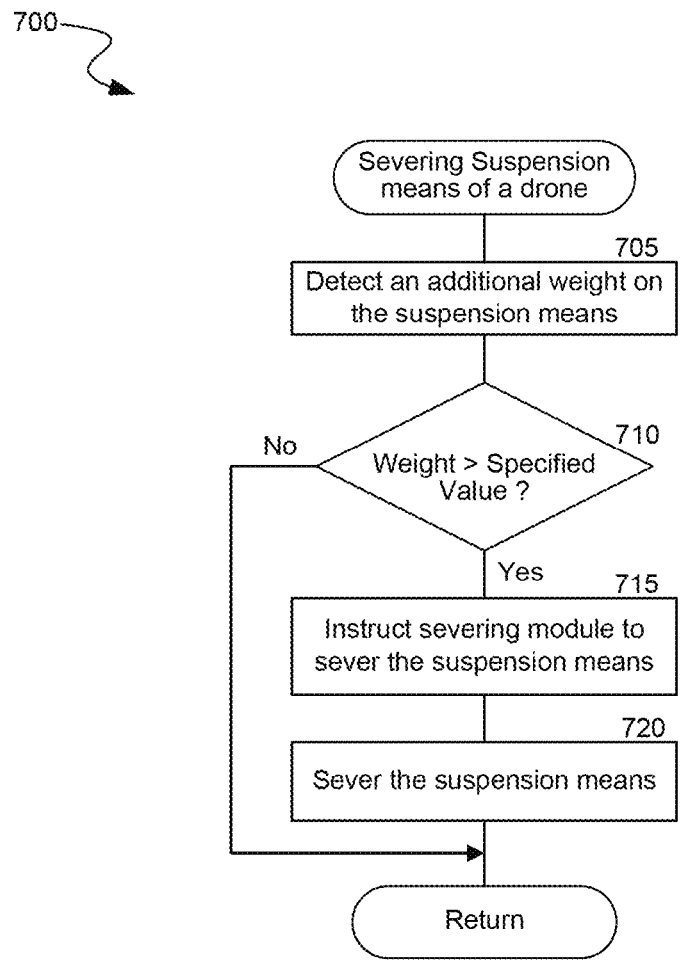
FIG. 7 is a flow diagram of a process for severing the suspension means of the drone, consistent with various embodiments.

FIG. 7 is a flow diagram of a process for severing the suspension means of a drone, consistent with various embodiments. The process 700 can be performed in the system 100 and using the drone 120 of FIG. 1. At block 705, the package delivery module 130 detects an additional weight on the suspension means 135. In some embodiments, the drone 120 has on-board sensors that can detect a change in load carried by the suspension means 135. For example, when the suspension means 135 is pulled by an animal or a person, or when the suspension means 135 is entangled in an obstacle like a tree, there can be an additional load added to the suspension means 135.

At determination block 710, the package delivery module 130 determines whether the changed weight exceeds a specified value. If the weight does not exceed the specified value, the process 700 returns. On the other hand, if the weight exceeds the specified value, at block 715, the package delivery module 130 instructs the severing module 145 to sever the suspension means 135.

At block 720, the severing module 145 severs the suspension means 135. In some embodiments, the severing module 145 includes a nichrome wire 305 that is used to sever the suspension means 135. When the suspension means 135 has to be severed, the severing module 145 passes an electric current of a certain rating through the nichrome wire 305, which generates a significant amount of heat causing the suspension means 135 to be severed at the portion where the nichrome wire 305 is in contact with the suspension means 135.

In determining whether the weight exceeds the specified value, the package delivery module 130 considers various factors, e.g., weight of the package if the package is still attached to the suspension means 135, change in weight because of the haphazard movement of the suspension means 135 due to strong winds, etc. The package delivery module 130 will calculate the change in weight accordingly.

Further, one or more operations of the processes 400-700 can be performed manually, e.g., remotely by an operator of the drone 120 from the base station 125, or automatically by the drone 120. For example, when the drone 120 reaches the delivery area 215 at the delivery destination, the package delivery module 130 can automatically deliver the package 211 or wait to receive instructions from the operator of the drone 120. In another example, the severing module 145 can sever the suspension means 135 automatically or wait for the operator to command the severing module 145 to sever the suspension means 135.

In some embodiments, the drone 120 has various on board sensors and communication systems that transmit a variety of data, e.g., images, video feeds, alerts and/or notifications to the base station 125 using which the operator of the drone 120 or the base station 125 itself can make various decisions and issue to commands to the drone 120. For example, when the suspension means 135 is experiencing an additional load, the drone 120 can notify the base station 125 regarding the change in weight and send a video feed too. The operator at the base station 125 can view the video feed and decide whether to sever the suspension means 135.

Figure 8:
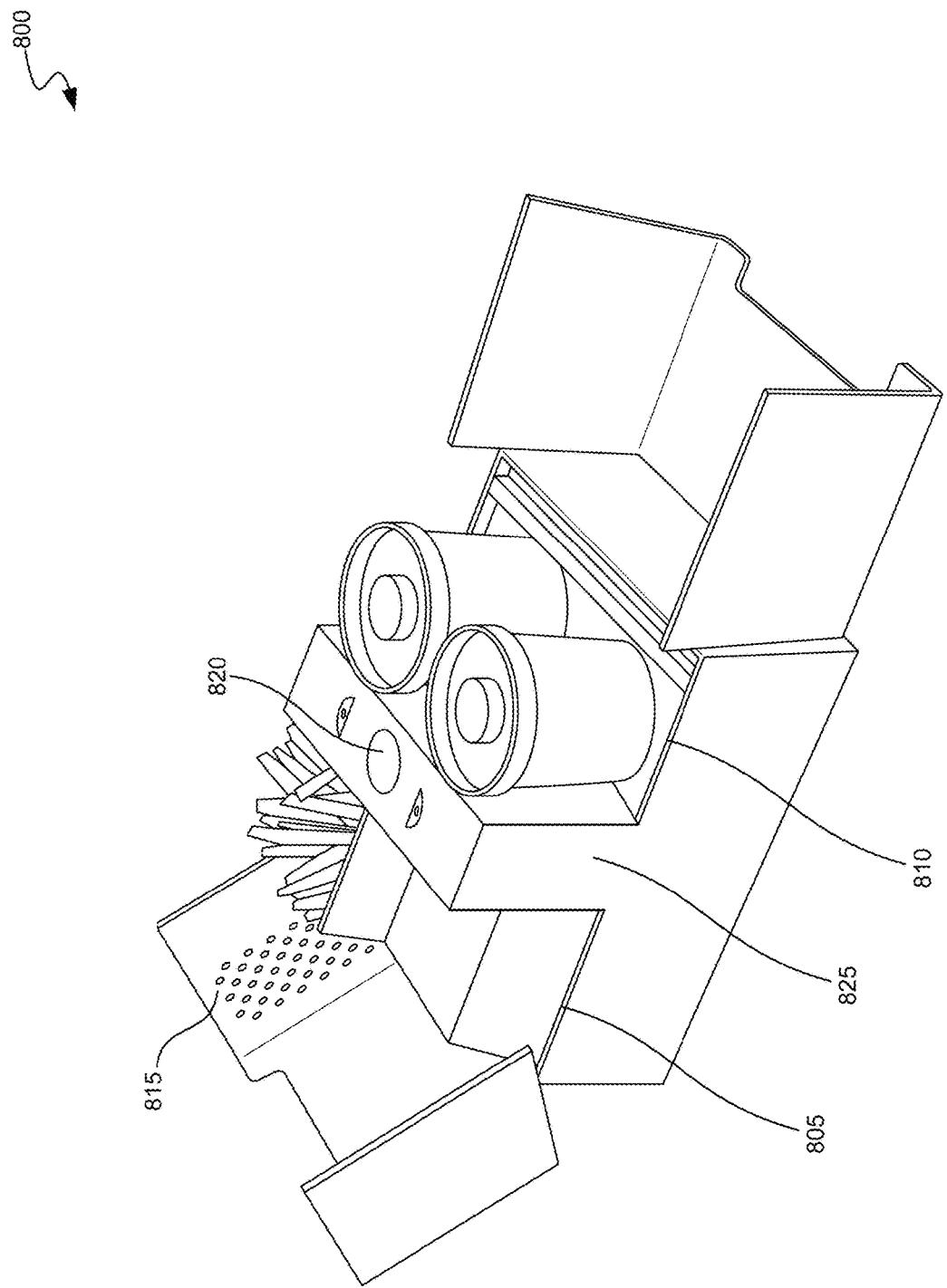
FIG. 8 is a diagram of a container for delivering food, consistent with various embodiments.

FIG. 8 is a diagram of a container 800 for delivering food, consistent with various embodiments. The drone 120 can be used to deliver and/or pickup goods in a wide variety of containers. In some embodiments, the container 800 is similar to the package 211 of FIG. 2. The container 800 can include multiple compartments for holding different types of payload and/or different types of payload that are temperature sensitive, e.g., food, medicine, blood. For example, the container 800 can have a first compartment for holding a first type of payload that is to be maintained in a first specified temperature range, and a second compartment for holding a second type of payload that is to be maintained in a second specified temperature range. As an example, the container 800 includes various compartments for carrying various types of food, e.g., liquid food, solid food, hot food and/or cold food. In some embodiments, the container 800 can have separate sections for different types of food. The container 800 includes a hot food compartment 805 and a cold food compartment 810. In some embodiments, the hot food and cold food compartments are separated by a wall 825, which can have an insulated material. The container 800 includes ventilation 815 to keep hot food, such as chips, crisp. The container 800 can be connected to the suspension means 135 of the drone 120 at a coupler 820. In some embodiments, the coupler 820 is similar to the female coupler 250 of FIG. 2. The coupler 820 is offset to a compartment that carries heavier food, e.g., drinks, to ensure the weight is centered when heavier items are included. The entire container 800 is delivered to the customer.

The container 800 can be made of paper, cardboard or other suitable materials. The container 800 can have one or more lids which, when opened, provide access to the contents inside. In some embodiments, the lids open away from each other so that any area/compartment in the container 800 can be accessed conveniently.

Figure 9A:
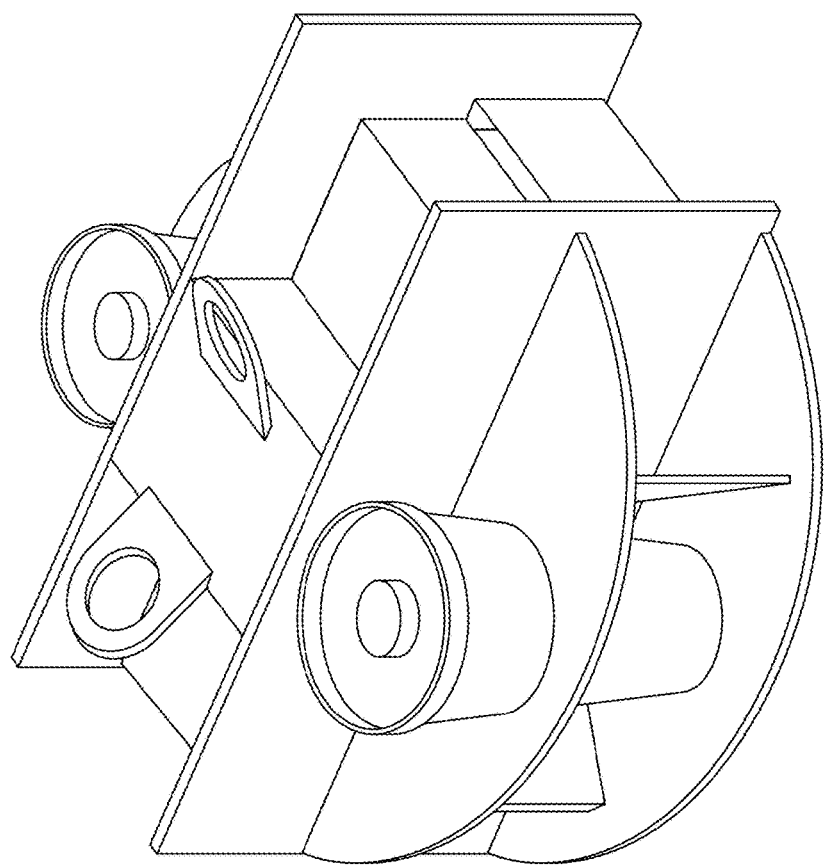
FIGS. 9A and 9B, collectively referred to as FIG. 9, is a diagram of a container, consistent with various embodiments.
Figure 9B:
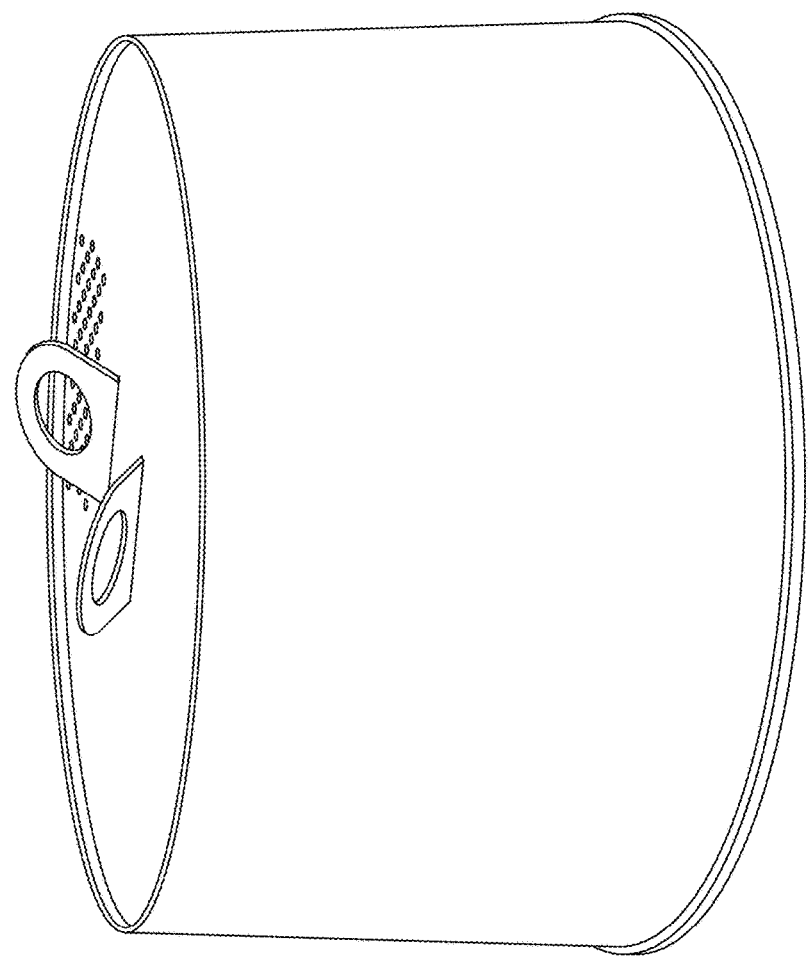

FIGS. 9A and 9B, collectively referred to as FIG. 9, is a diagram of a container 900, consistent with various embodiments. The container 900 can be round or round-like, e.g., elliptical, conical, in shape. In some embodiments, the shape of the container 900 can be representative of a bucket. The container 900 has a removable lid 950, which can be cylindrical, as illustrated in FIG. 9B. The container 900, like the container 800 of FIG. 8, can include various compartments for carrying various types of food, e.g., liquid food, solid food, hot food and/or cold food. The compartments can be designed such that when a set of food items are placed, the container 900 is well balanced, e.g., weight is centered. For example, as illustrated in FIG. 9A, the two compartments for holding liquids, e.g., drinks, are located diametrically opposite to each other in the container 900 so as to center the weight. The container 900 can also include a compartment for carrying various types of cutlery.

The container 900 can have means for facilitating a customer to hold or carry the container. For example, the container 900 includes a pair of finger grips into which the customer can slip in his/her fingers and carry the container 900. The finger grips can be affixed to the container 900, or the lid 950 of the container 900 if the lid 950 of the container 900 can be locked/secured to the container 900.

In some embodiments, the container 900 is modular, e.g., can be made using a number of card plates, e.g., made out of cardboard, paper and/or other suitable material. The card plates (not illustrated) can have fold lines, slotted lines and/or slots along which one can fold the card plates to form the container 900 or a portion thereof. The card plates can then be assembled together to form the container 900. In some embodiments, the modular container portions are adjustable to carry payload of different sizes in different compartments, e.g., pizza in one compartment and medicine in another compartment.

The container 900 (or even the container 800) can be configured to pick up and/or deliver items other than food, e.g., goods such as electronics, apparel, shoes. The container 900 can be configured to have various types of compartments based on the type of the goods that have to be picked up/delivered. In some embodiments, the container 900 has foam or other similar material in the base, as illustrated in the example 1010 of FIG. 10A. The foam-based base can serve various purposes. For example, the foam-based base can hold the packages placed in the container 900 in a stable position by minimizing the movement of the package during the flight. In another example, the foam-based base can act an impact-absorbing base by provide additional cushion between a soft outer layer of cardboard of the base of the container 900 and a potentially hard inner object such as a bottle of wine which makes it safer if the container 900 falls off the drone 120 and hits a person or property. The foam-based base enables delivering of a variety of shaped objects whether rectangular, triangular, elliptical, etc. (provided they can fit in the container 900, and be held in position by the foambased base). For example, if a box containing a pair of shoes is to be delivered, the box would be placed inside the container 900, it would be held in position by foam, and then the container 900 holding the box could be picked up to the drone 120; then delivered at the destination.

Figure 10B:
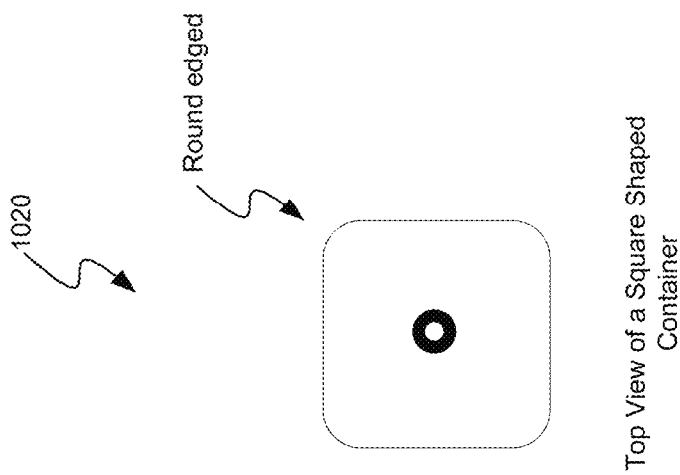
FIG. 10B is a top view of a container having rounded edges, consistent with various embodiments.
Figure 10A:
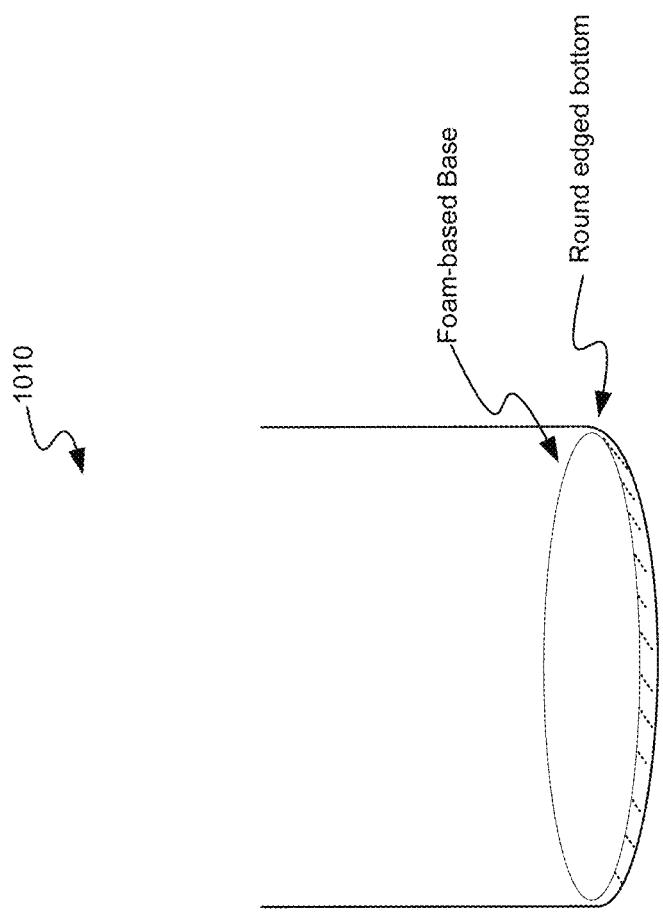
FIG. 10A is a diagram of a container having a foam-based base, consistent with various embodiments.

In some embodiments, the container 900 has no corners or edges on the exterior surface of the container 900. The container 900 can have a spherical underside with a flat bottom that eliminates corners/edges. The corners can be rounded as illustrated in the example 1010 of FIG. 10A. The rounded corners can be safer than the straight edged corner. With the rounded corners, if the container 900 falls from the drone 120 and hits a person or any other object, the round corners/edges of the exterior deforms more than a straight edged corner/edge, that is, absorbs the impact more than the straight edged corners, and is therefore, safer on the person or the object on which the container 900 crashed. FIG. 10B is a top view of a square shaped container 1020 with round corners, consistent with various embodiments.

Figure 11A:
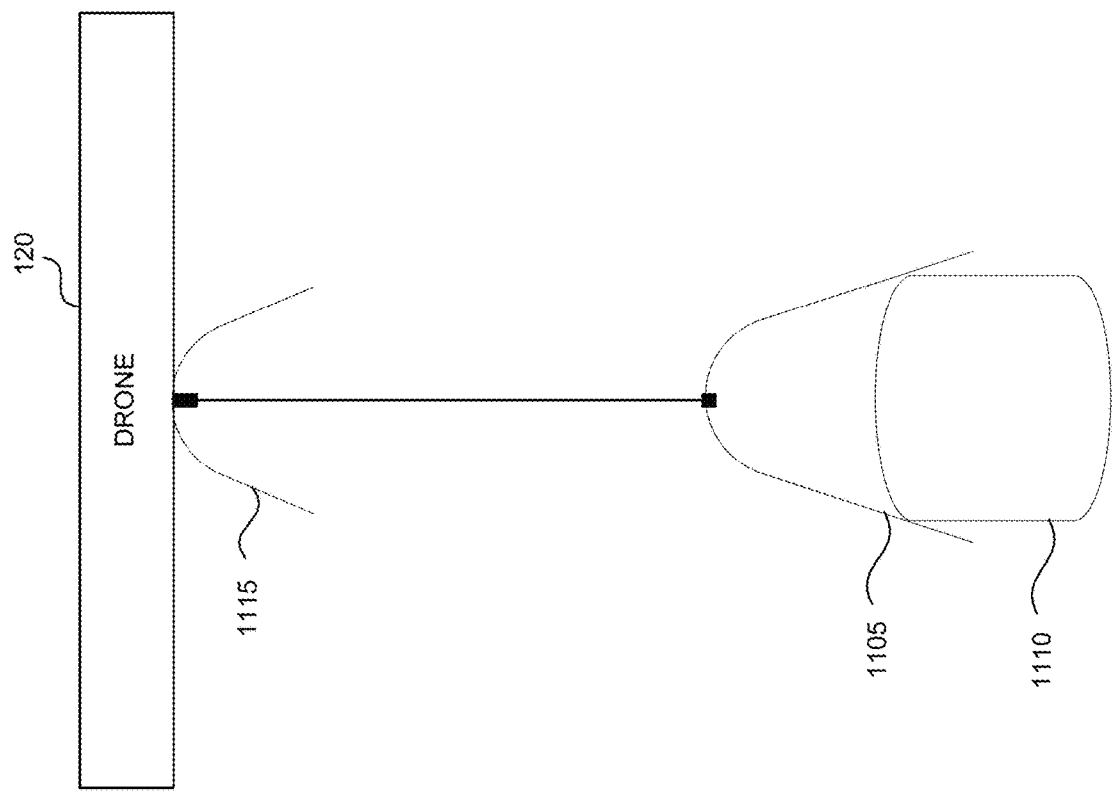
FIG. 11A is a diagram of a hood that holds a container onto the drone, consistent with various embodiments.
Figure 11B:
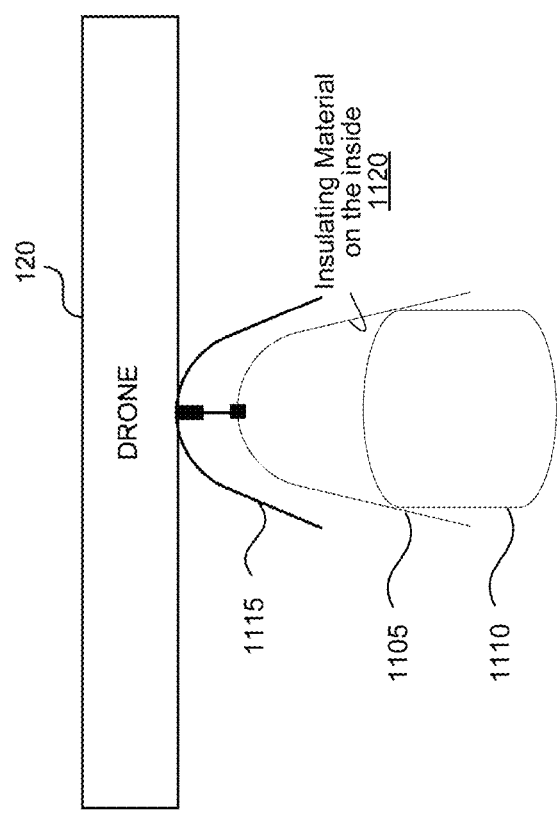
FIG. 11B is a diagram illustrating the container housed in the container housing of the drone, consistent with various embodiments.

In some embodiments, the container can be held onto the drone 120 using a conical hood. FIG. 11A is a diagram of a hood 1105 that holds a container 1110 onto the drone 120, consistent with various embodiments. In some embodiments, the container 1110 is similar to the container 900, container 800 or the package 211. A package to be delivered can be placed in the container 1110. When a drone picks up a container, the container can turn/rotate/move in the wind and the container may not align itself in a container housing fixed to the drone 120. So to ensure that the container 1110 mounts correctly on the underside of the drone 120, e.g., in the container housing 1115, the container 1110 is affixed to a hood 1105, which is then drawn into the container housing 1115 by the suspension means, e.g., suspension means 135. The hood 1105 can be conical or conical like, e.g., spherical, in shape. The hood 1105 has a means to connect to the suspension means. In some embodiments, the lid of the container 1110 can be designed as the conical hood 1105. In some embodiments, the hood 1105 is affixed to the container 1110, e.g., to the lid of the container 1110. When the container 1110 is lifted up by the drone 120, the hood 1105 is drawn into the container housing 1115 and the container 1110 is housed within the container housing 1115 of the drone 120. In some embodiments, the container housing 1115 is a concave structure, e.g., conical concave structure, that can conveniently house the entire container 1110 or a portion of the container 1110, e.g., a significant portion of the container 1110, so as to keep the container 1110 from moving due to wind while in flight. FIG. 11B is a diagram illustrating the container 1110 housed in the container housing 1115 of the drone 120. However, in other embodiments, the hood 1105 is a concave structure and the container housing is a convex structure. This design may be advantageous for certain drones because it still enables self-aligning of the container in the container housing and has thicker padding at the center of gravity of the drone.

Further, having the container housing 1115 and the container hood 1105 in the conical shape facilitates easy mounting, alignment and/or housing of the container 1110 in the container housing 1115 compared to other shapes. For example, if the container housing 1115 is of a square shape, and if the container is also of square shape, it may be difficult to align the container 1110 within the container housing 1115, especially if there is any wind.

Also, in the case of food delivery, in some embodiments, the hood 1105 contains insulating material 1120 on the interior walls of the hood to keep the food warm/cold. In some embodiments, to maintain the temperature of the food at a given temperature, the amount of surface area of the container 1110 that is in contact with the hood 1105 has to be maximized, e.g., it has to be a round surface on surface, which can mean the container 1110 and the hood 1105 may have to be circular/round or conical in shape. In some embodiments, the insulating material 1120 can be a material that provides insulation against electro-magnetic fields and/or electro-static discharges, e.g., faraday cage insulation, which can be helpful for transporting electronic/magnetic goods.

Figure 12A:
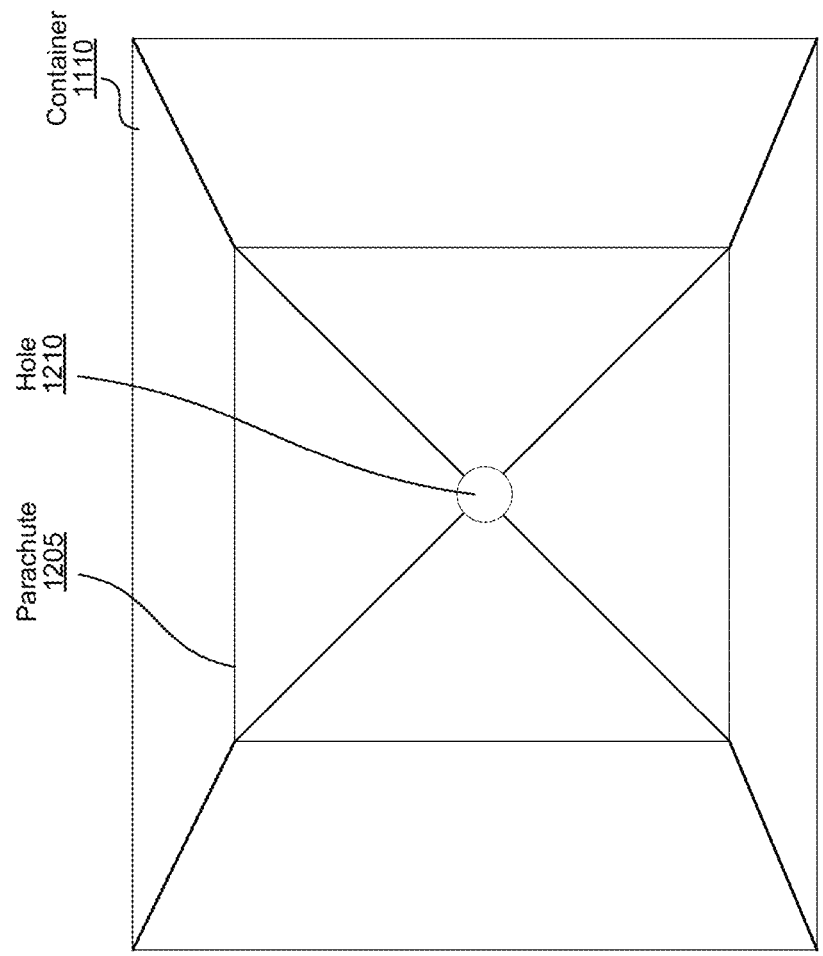
FIG. 12A is a diagram of an example of a parachute affixed to a container, consistent with various embodiments.

FIG. 12A is a diagram of an example of a parachute affixed to a container, consistent with various embodiments. The container 1110 to be dropped off at a delivery location can be installed with a parachute 1205, e.g., made of cloth, paper or paper-type material. The parachute 1205 can be folded and installed on top of the container. The parachute 1205 has a hole 1210, e.g., round in shape, in the top and middle, which is where the container 1110 may be mounted to the suspension means 135 of the drone 120. The parachute 1205 can be attached to the container 1110 at a number of locations, e.g., at at least 3 locations.

Figure 12B:
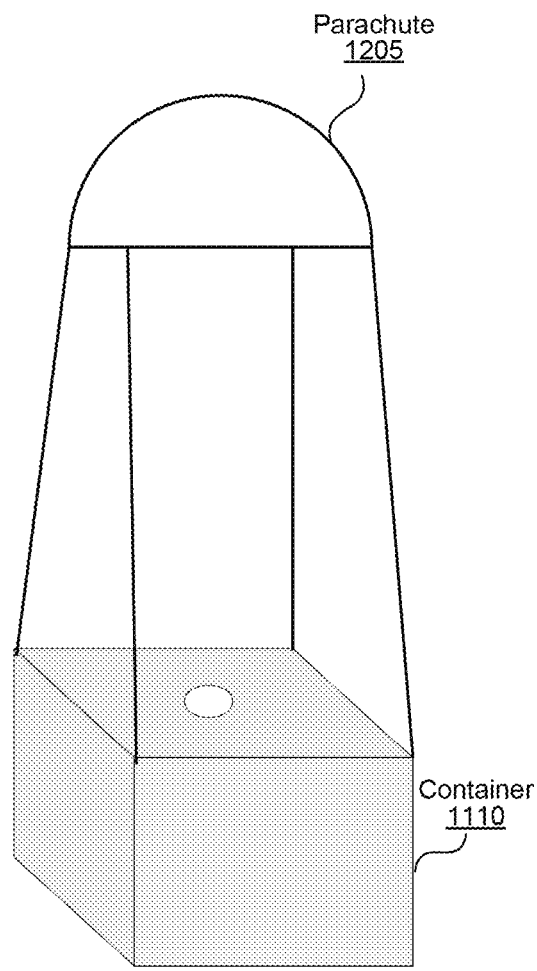
FIG. 12B is a diagram of an example in which a parachute connected to the container is deployed, consistent with various embodiments.

FIG. 12B is a diagram of an example in which the parachute of FIG. 12 A is deployed, consistent with various embodiments. In the FIG. 12B, the parachute 1205 is connected to the container 1110 at four locations, e.g., near the four corners of the container 1110. The parachute 1205 can be configured to deploy in response to a trigger. In some embodiments, the parachute 1205 will deploy if the suspension means 135 of the drone 120 snaps.

FIG. 13 is a diagram of the drone 120 with various parts of the package delivery module of FIG. 1, consistent with various embodiments. The drone 120 includes arm guards 1305 that are configured to protect the arms of the drone 120, e.g., against impact on crash landing, and also, the propellers 1315 installed on the arms. The package delivery module 130 includes a "dog bowl" like structure 1310 onto which a container housing 1115 fits snugly. The package delivery module 130 includes the container housing 1115 to house the package during the flight. The packages, e.g., container 1110, are mounted in the center of the drone 120, and therefore the container housing 1115 is mounted in the center of the drone 120. By having a center mounting point, the weight of the container 1110 is centered at the middle of the drone 120, e.g., even with different size/weight containers, which enables the drone 120 to have stability in flight. The container housing 1115 also limits and/or hide the wobbling of the container 1110 during flight. In some embodiments, the drone 120 may not include the container housing 1115, e.g., if the suspension means 135 is tight enough to limit the wobbling of the package.

The package delivery module 130 includes the container hood 1105. As described above, the hood 1105 contains insulating material on the interior walls, e.g., to keep the food being delivered warm/cold. In some embodiments, to maintain the temperature of the food at a given temperature, the hood can be installed with sensor to monitor and regulate the temperature to ensure the food arrives to the customer at guaranteed food quality standards (and at safe temperatures). The hood 1105 can log the temperature data and store it and/or report it to an on-board processor (not illustrated) of the drone 120 and/or to the operator. The on-board processor or the operator can then take necessary steps, e.g., increase or decrease the temperature, to keep the food at required temperatures. The drone 120 typically has a temperature controlling mechanism, e.g., heating elements and/or cooling elements in the package, to regulate the temperature of the food during the flight, and is powered by the power supply of the drone 120 and/or of the package delivery module 130. The insulating material can also provide electro-magnetic and/or electro-static shielding.

The package delivery module 130 also includes an anti-roll feature. The anti-roll feature facilitates the drone 120 to land on the container housing 1115 even without the hood 1105 inside it, e.g., for emergencies. The anti-roll feature also prevents tipping, and even if the drone 120 tilts, the propellers 1315 cannot hit the ground, as shown by the angle depicted in FIG. 14.

Referring back to FIG. 13, the container 1110 to be delivered by the drone 120 can be of various shapes and sizes. In some embodiments, the container 1110 is similar to the package or container described at least with reference to FIGS. 2, 8, 9A, 9B, 10A and 10B. The container 1110 is designed so it can carry a variety of different product sizes including parcels and fast food with none-to-minimum changes to the container 1110 (besides adding inserts to ensure the goods that are delivered have a snug and insulated fit so they don't roll around and are kept at the correct temperature). The container 1110 can include variable padding based on the center of gravity of the drone 120, e.g., padding is thickest where the center of gravity is of greatest which makes it safer for people upon impact when the container crash lands on people. The hood 1105 can also cover the container in foam, which provides an additional safety measure. For example, if the suspension means 135 is severed and when the container 1110 falls, in the event of an impact with a person, the container 1110 hits the person with the foam rather than with a corner or edge, which makes it safer.

Note that the components or parts of the package delivery module 135 or the drone 120 illustrated in FIG. 13 are in just one embodiment. Other embodiments can have more parts or have fewer parts. For example, in one embodiment, the package delivery module 135 may not have the dog bowl 1310.

Figure 15A:
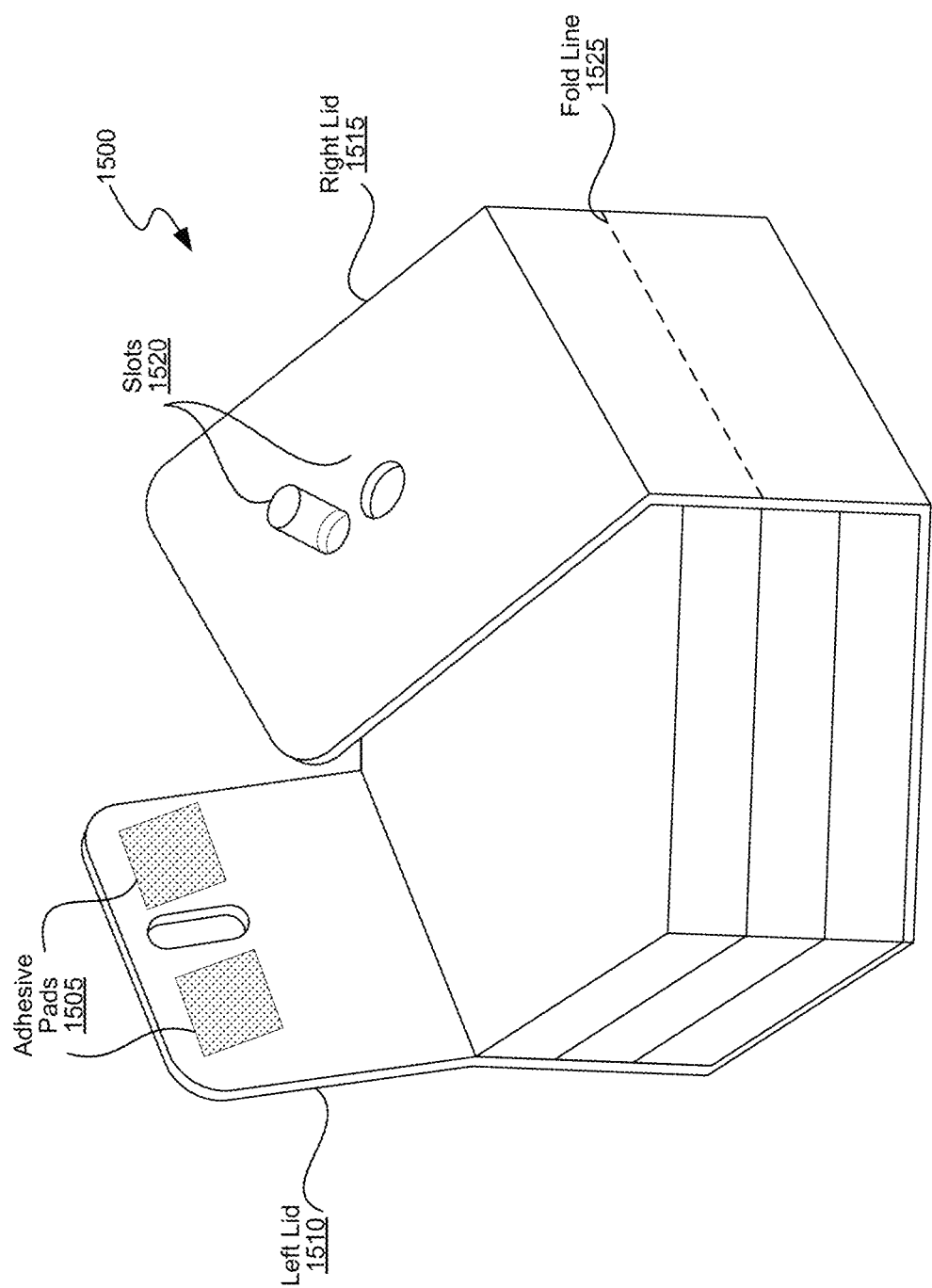
FIG. 15A is a diagram of an hex-box container for delivering food, consistent with various embodiments.
Figure 15B:
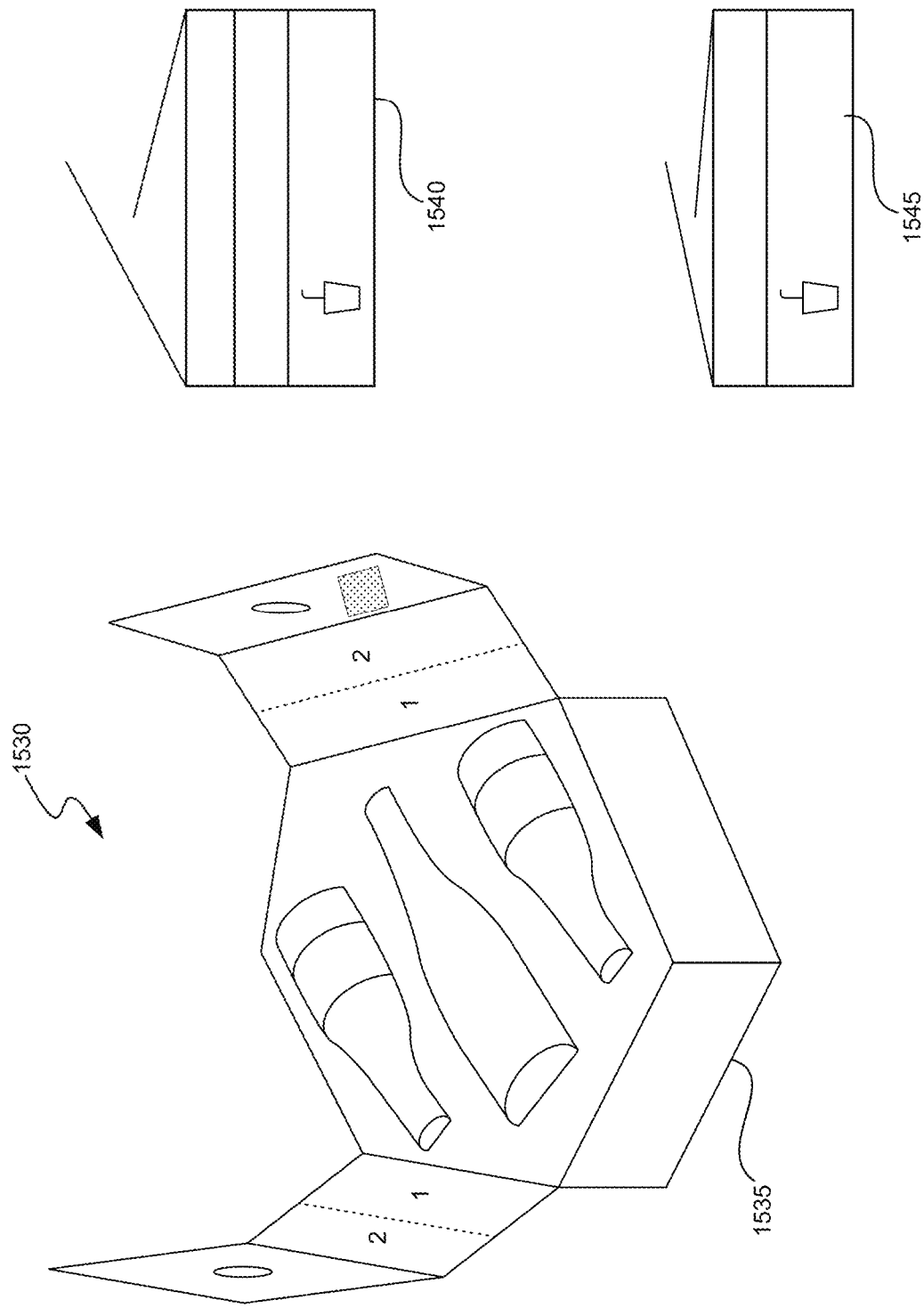
FIG. 15B is another diagram of the hex-box container for delivering food, consistent with various embodiments.
Figure 16:
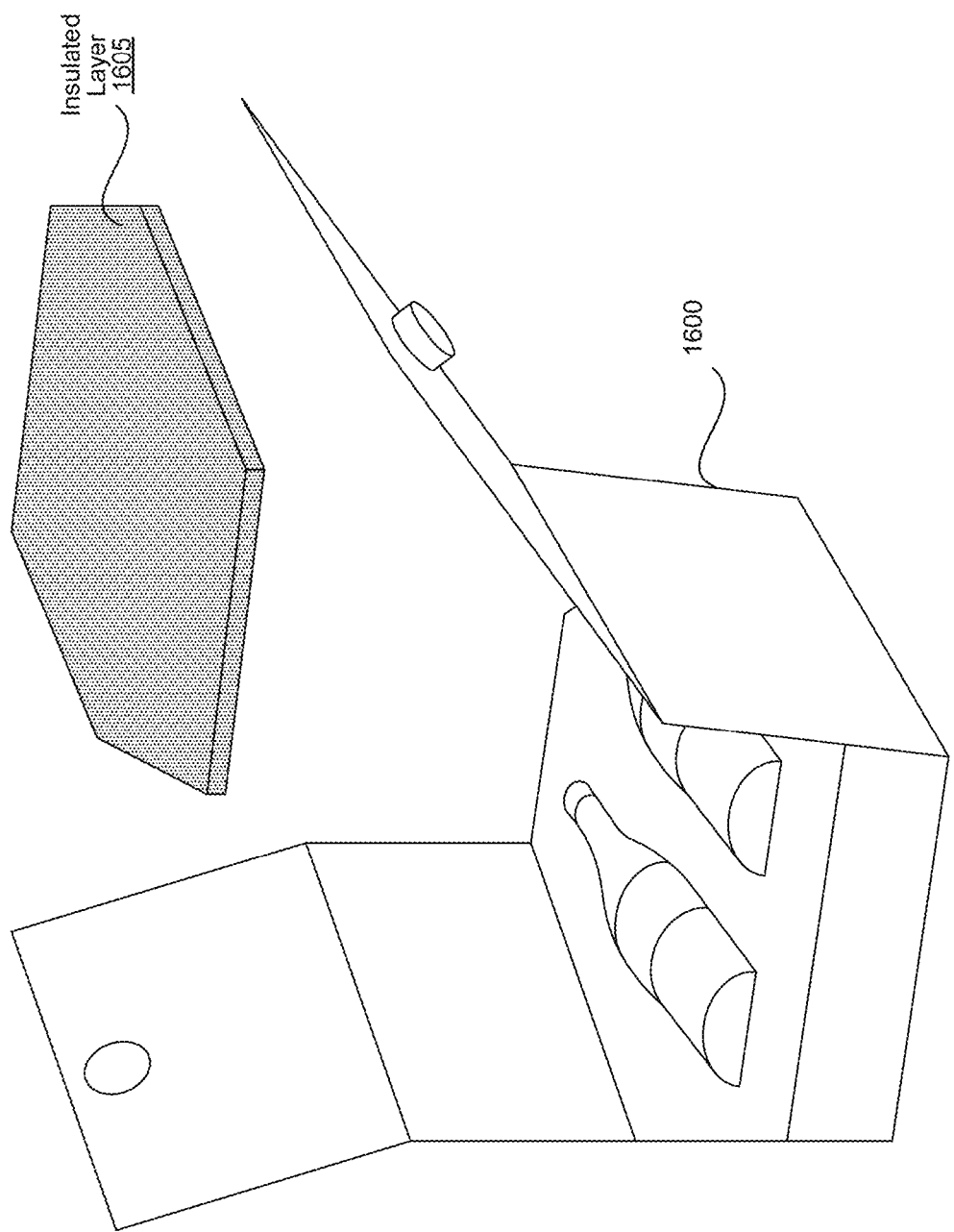
FIG. 16 is a diagram of another container for carrying beverages, consistent with various embodiments.

FIGS. 15A, 15B and 16 also illustrate various configurations of the container 1110. FIG. 15A is a diagram of a first hex-box container 1500 for delivering food, consistent with various embodiments. The first hex-box container 1500 can be used to carry food and drinks such as a pizza and a beverage, e.g., soda or wine. The first hex-box container 1500 is an adjustable hex box, which has three compartments stacked one over the other. The top two of the three compartments can be used to carry pizza, and the bottom compartment can be used to carry drinks. The first hex-box container 1500 can be made of paper, cardboard or a similar suitable material and can be assembled easily from an initial flat sheet, e.g., by folding the sheet along the fold lines 1525. The first hex-box container 1500 can be adjusted to three stacked compartments or to two stacked compartments.

The first hex-box container 1500 can have adhesive pads 1505 under the lid using which the left lid 1510 and the right lid 1515 can be secured to each other. The lids also have one or more slots 1520 for the coupler of the container, which connects to the suspension means 135. The lids can have more than slot for the coupler as the position of the coupler of the first hex-box container 1500 can change depending on whether the first hex-box container 1500 is two layered container or a three layered container.

FIG. 15B is a diagram of a second hex-box container for delivering food, consistent with various embodiments. The second hex-box container 1530 in FIG. 15B shows a pair of wine bottles housed in the slots in the bottom-most compartment 1535 of the second hex-box container 1530. The second hex-box container 1530 can also be configured to carry one or more drinks. For example, the second hex-box container 1530 will have a single slot for carrying one drink and two slots for two drinks. The second hex-box container 1530 can be configured, e.g., folded across appropriate fold lines, to have two layers for carrying solid food, e.g., pizza, and one bottom layer for beverages as shown by example 1540, and configured to have one layer for carrying solid food and one bottom layer for beverages as shown by example 1545. The shape and size of the slots can vary and depends the shape and size of the drink containers to be carried.

Note that the configuration of the containers, e.g., shape, size, the number of compartments, are completely configurable and is not restricted to the illustrated embodiments.

FIG. 16 is a diagram of another container for carrying beverages, consistent with various embodiments. The container 1600 is a rectangular or square shaped container configured to carry a beverage. The container has slots for carrying two beverages, e.g., a pair of wine bottles. Also, the beverages in the container can be wrapped with an insulating layer 1605 as illustrated to keep the beverages at a constant temperature or to minimize the temperature change. The container 1600 also has a slot for placing the coupler, which is used to attach the container 1600 to the suspension means 135 of the drone 120. In some embodiments, the container 1600 is similar to the container 1110 or the package 211.

FIGS. 17A-17E, collectively referred to as FIG. 17, is a diagram illustrating an example of delivering a package using a drone, consistent with various embodiments. The example can be implemented in the system 100 of FIG. 1 and using the drone 120. In some embodiments, the example is similar to the example 200 illustrated in FIG. 2. As illustrated in FIG. 17A, the drone 120 is in flight en route to a delivery destination to deliver a package, e.g., container

1110. In some embodiments, the container 1110 is attached to the drone 120 via the suspension means 135 and is locked to the suspension means 135 via the locking mechanism 140.

Figure 17B:
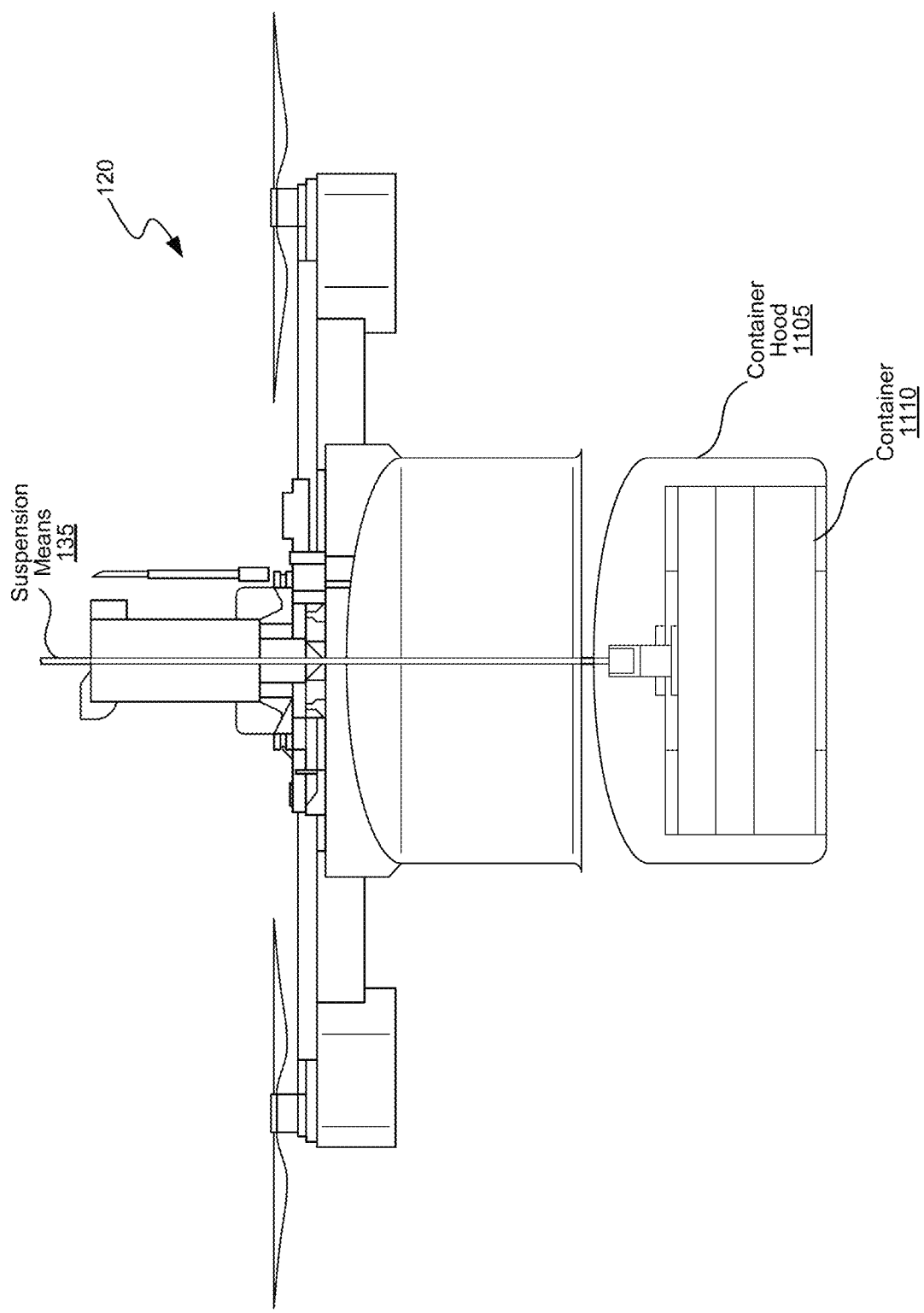
FIG. 17B is a diagram illustrating the drone lowering the package, consistent with various embodiments.
Figure 17C:
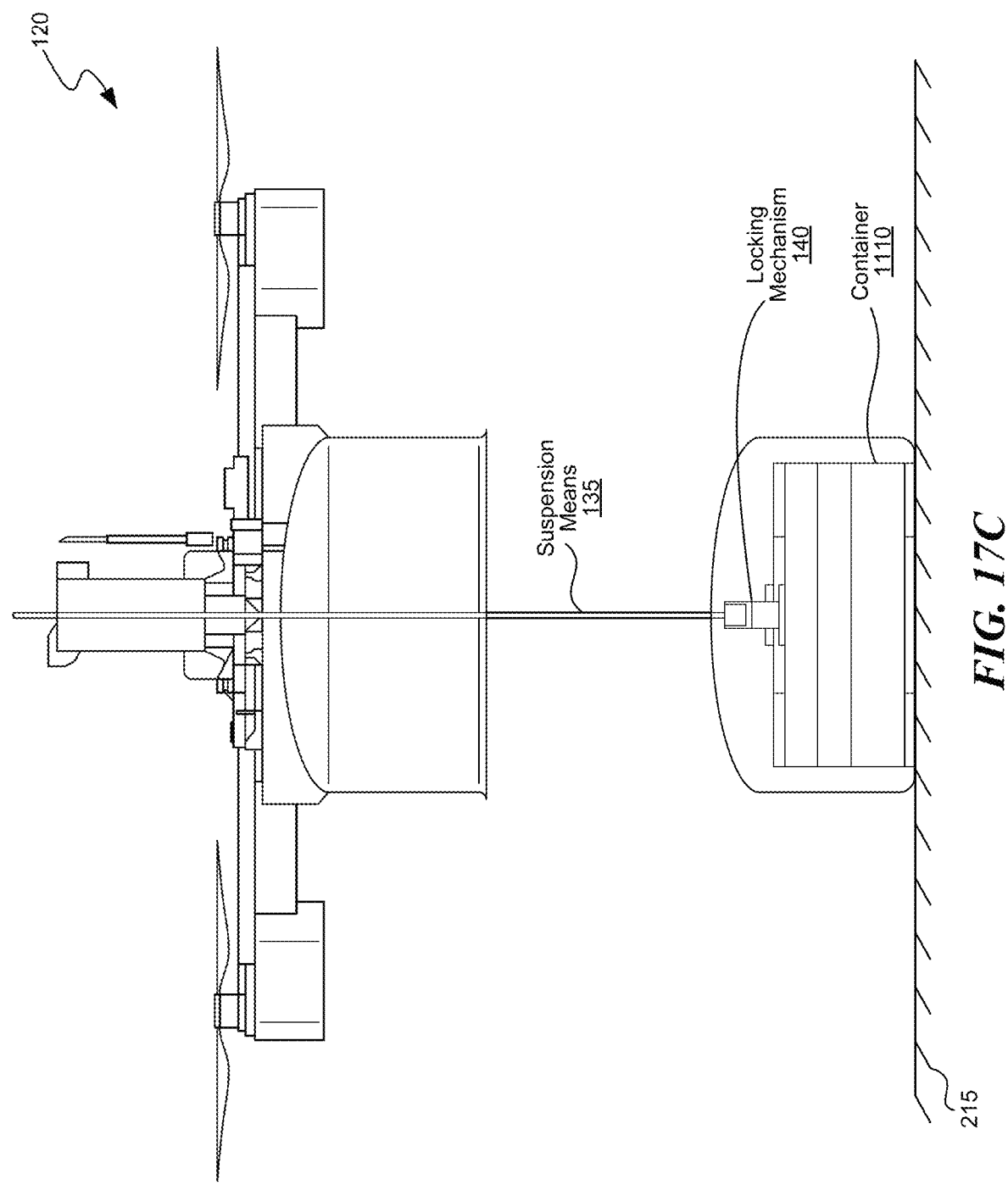
FIG. 17C is a diagram illustrating the drone placing the package on a delivery area at a delivery destination, consistent with various embodiments.

Upon reaching the delivery destination, the drone 120 prepares to lower the container 1110 at a delivery area in the delivery destination. As illustrated in FIG. 17B, the drone 120 while hovering at the delivery area at a particular height from the ground, lowers the suspension means 135 to deliver the container 1110. The hood 1105 is lowered to deliver the container 1110. While FIG. 17B illustrates the container 1110 being visible from outside the hood 1105, note that the container 1110 can be concealed in the hood 1105. The drone 120 continues to lower the suspension means 135 until the container 1110 rests on the delivery area 215, as illustrated in FIG. 17C. When the container 1110 rests on the delivery area 215, e.g., the ground, the locking mechanism 140 is disengaged to release the container 1110. The locking mechanism 140 can be operated in automatic-coupling mode or a passive coupling-mode to unlock, as described at least with reference to FIG. 2E.

Figure 17D:
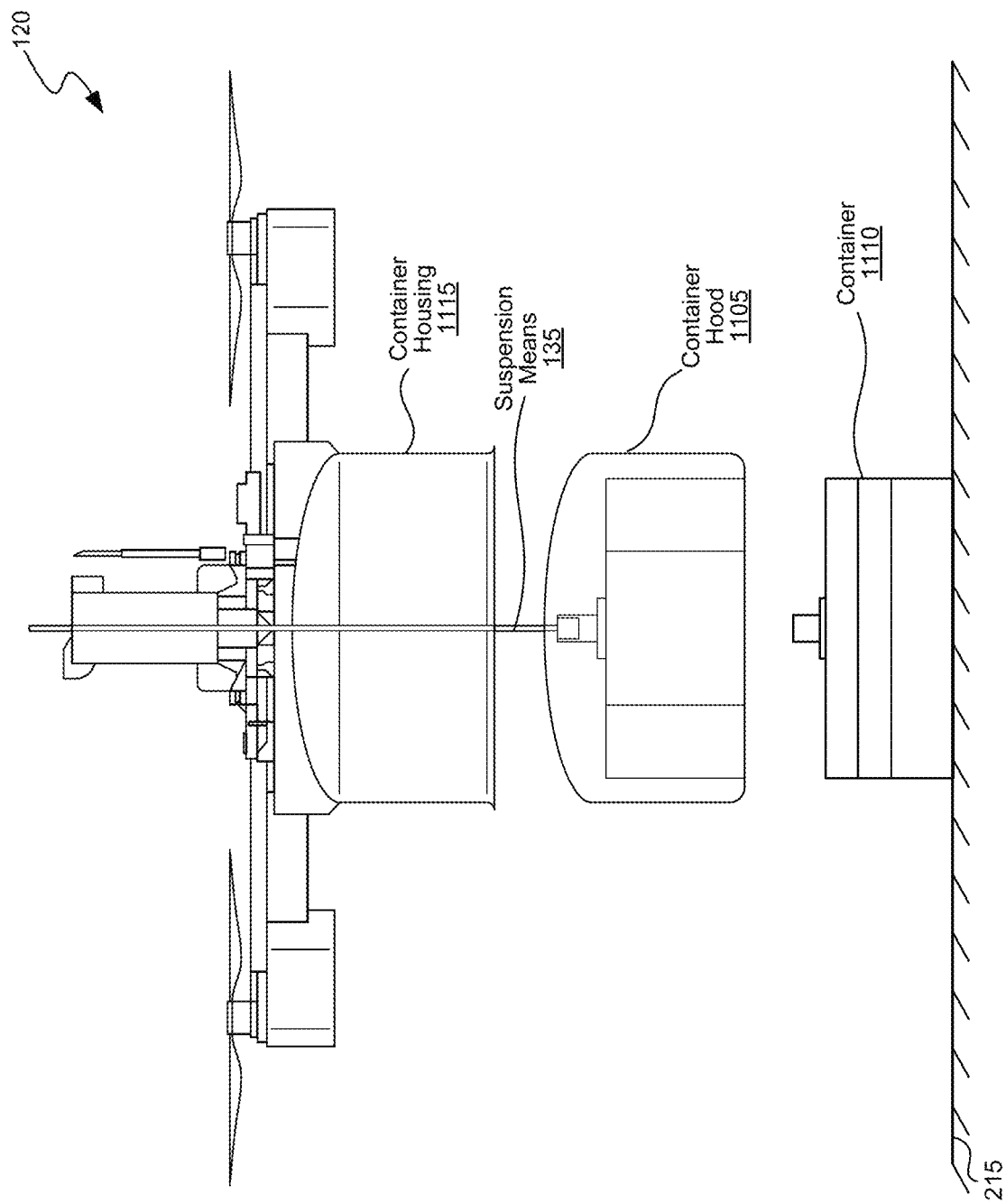
FIG. 17D is a diagram illustrating the drone retracting the suspension means after lowering the package to the surface at the delivery destination, consistent with various embodiments.
Figure 17E:
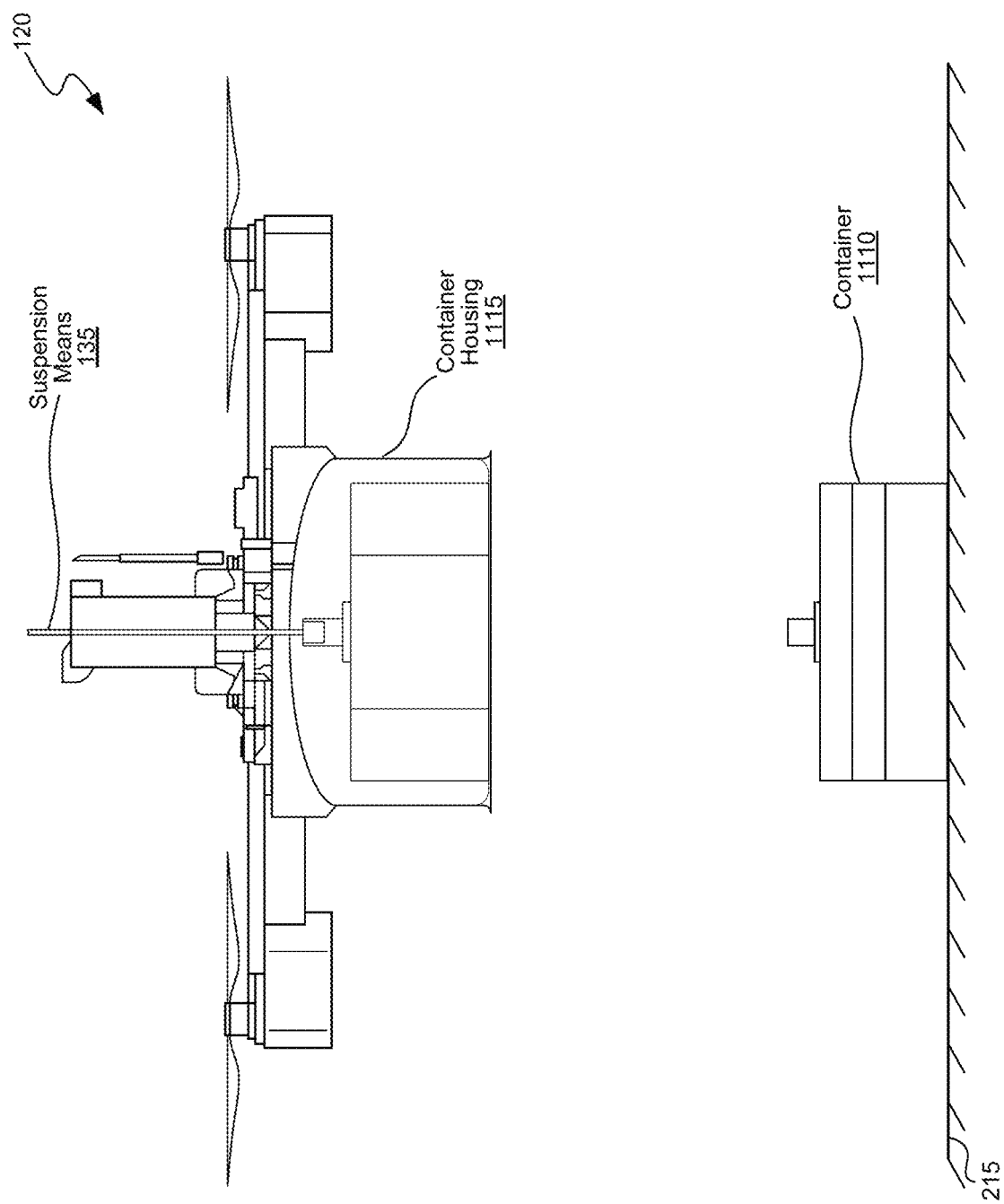
FIG. 17E is a diagram illustrating the hood being fully retracted into a container housing of the drone, consistent with various embodiments.

After the package is lowered in the delivery area 215 and released from the locking mechanism 140, the drone 120 retracts the hood 1105 as illustrated in FIG. 17D. The drone 120 continues to retract the suspension means 135 until the hood 1105 is secured into the container housing 1115, as illustrated in FIG. 17E.

The configuration of the hood 1105 and the container housing 1115 can enable self-aligning retraction of the container 1110, which enables the package delivery mechanism to perform pickups in addition to deliveries. The self-aligning retraction can also facilitate mid-delivery aborts, e.g., aborting delivery midway and retracting the container 1110 back to the container housing 1115. The packages can be picked up from or delivered to consumers while the drone 120 is in hover.

Also, since the hood 1105 lowers with the container 1110, in some embodiments, if the suspension mechanism 135 is severed, the likelihood of the container 1110 landing on its edge on someone is reduced significantly and therefore, it is more safer. Also the hood 1105 can keep the hot food hot on its the way to the destination. Further, since the container 1110 is concealed in the hood 1105, after the container 1110 is delivered on the ground, the hood 1105 lifts away to reveal the container 1110, which provides a magical effect of the container 1110 appearing all of a sudden.

Figure 18:
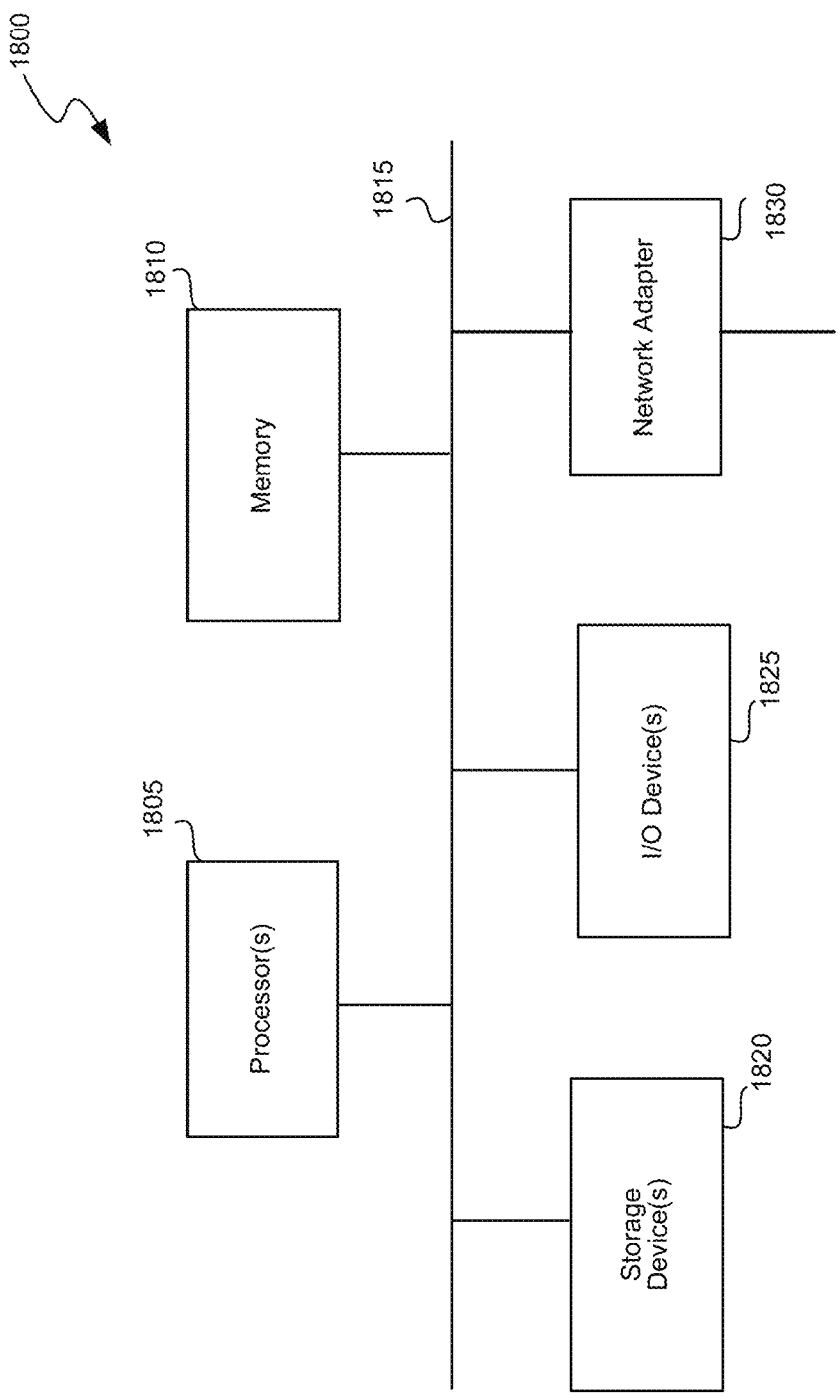
FIG. 18 is a block diagram of a computer system as may be used to implement features of the disclosed embodiments.

FIG. 18 is a block diagram of a computer system as may be used to implement features of the disclosed embodiments. The computing system 1800 may be used to implement any of the entities, components, modules, mechanisms, or services depicted in the examples of the foregoing figures (and any other described in this specification). The computing system 1800 may include one or more central processing units ("processors") 1805, memory 1810, input/output devices 1825 (e.g., keyboard and pointing devices, display devices), storage devices 1820 (e.g., disk drives), and network adapters 1830 (e.g., network interfaces) that are connected to an interconnect 1815. The interconnect 1815 is illustrated as an abstraction that represents any one or more separate physical buses, point to point connections, or both connected by appropriate bridges, adapters, or controllers. The interconnect 1815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1810 and storage devices 1820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1810 can be implemented as software and/or firmware to program the processor(s) 1805 to carry out actions described above. In some embodiments, such software or firmware may be initially provided to the processing system 1800 by downloading it from a remote system through the computing system 1800 (e.g., via network adapter 1830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A drone comprising:
   suspension means configured to hold a package that is to be delivered or picked up;
   a locking mechanism in the suspension means configured to securely hold the package onto the suspension means; and
   a package delivery mechanism configured to control a movement of the suspension means for delivering the package on a delivery area at a delivery destination, or for picking up the package;
   wherein the locking mechanism is gravity activated to hold and release the package from the suspension means;
   wherein the locking mechanism is configured to:
      hold the package locked to the suspension means when a gravitational force exerted on the locking mechanism exceeds a first specified value due to the weight of the package; and
      automatically rotate to release the package from the suspension means when the gravitational force exerted on the locking mechanism drops below a second specified value due to the weight of the package.

2. The drone of claim 1, wherein the suspension means is configured to be wound around a spindle on the drone when the suspension means is in a retracted position.

3. The drone of claim 1, wherein the suspension means is a cable made of at least one of a metal, a metal alloy, a filament, a fiber, a thread, or a microfilament.

4. The drone of claim 1, wherein the suspension means includes a first end that is attached to the package delivery mechanism and a second end that is attached to the locking mechanism.

5. The drone of claim 1, wherein the suspension means is made of a material that is severable by application of heat or using a cutting instrument.

6. The drone of claim 1, wherein the locking mechanism is configured to:
   couple with a coupling mechanism of the package to hold the package securely onto the suspension means, and decouple with the coupling mechanism to release the package from the suspension means.

7. The drone of claim 6, wherein the locking mechanism is configured to couple with the coupling mechanism in an automatic-coupling mode, the automatic-coupling mode including coupling the locking mechanism with the coupling mechanism automatically by the drone.

8. The drone of claim 6, wherein the locking mechanism is configured to couple with the coupling mechanism in a passive-coupling mode, the passive-coupling mode including one or more manual operations to be performed by a human user to couple the locking mechanism with the coupling mechanism.

9. The drone of claim 1 further comprising:
   a severing module configured to sever the suspension means from the drone.

10. The drone of claim 9, wherein the severing module is configured to sever the suspension means (a) in an event a load on the suspension means exceeds a specified value, (b) automatically by the drone, or (c) in response to the drone receiving a command from a human operator.

11. The drone of claim 9, wherein the severing module is configured to sever the suspension means by applying heat on the suspension means or by using a cutting instrument.

12. The drone of claim 11, wherein the severing module is configured to apply heat on the suspension means by using a nichrome wire.

13. The drone of claim 12, wherein the nichrome wire is configured to be wound around a portion of the suspension means.

14. The drone of claim 9, wherein the drone comprises a sensor to monitor a load on the suspension means.

15. The drone of claim 14, wherein the package delivery mechanism is configured to instruct the severing module to sever the suspension means in an event a load on the suspension means exceeds a specified value.

16. The drone of claim 1 further comprising:
   an application module that is configured to execute a delivery application that facilitates the drone in delivering the package to the delivery destination or picking up the package from a pick up location.

17. The drone of claim 16, wherein the application module is configured to receive location information of the delivery destination, wherein the location information includes an address of the delivery destination, global positioning system (GPS) co-ordinates of the delivery destination, or a smartphone location.

18. The drone of claim 16, wherein the application module is further configured to determine a delivery route of the drone based on the delivery destination.

19. The drone of claim 16, wherein the application module is configured to:
   monitor a location of the drone; and
   notify the package delivery mechanism upon reaching the delivery destination.

20. The drone of claim 19, wherein the application module is configured to:
   instruct the drone to hover at the delivery destination at a particular height from the ground, and
   instruct the package delivery mechanism to lower the suspension means to deliver the package.

21. The drone of claim 16, wherein the application module is configured to receive location information of the pickup location, wherein the location information includes an address of the pickup location, GPS co-ordinates of the pickup location, or a smartphone location corresponding to the pickup location.

22. The drone of claim 21, wherein the application module is configured to instruct the package delivery mechanism to lower the suspension means to pick up the package upon reaching the pickup location.

23. The drone of claim 1 further comprising:
multiple suspension means.

24. The drone of claim 23, wherein the multiple suspension means is used to carry multiple packages.

25. The drone of claim 23, wherein a first suspension means of the multiple suspension means is used as a primary suspension means to carry the package and a second suspension means is used as a stand-by suspension means.

26. The drone of claim 1 further comprising:
a container in which the package is carried by the drone, and
a container hood attached to the suspension means, wherein the container is connected to the suspension means within the container hood.

27. The drone of claim 26, wherein the container includes multiple compartments for holding different types of payload that are temperature sensitive, wherein the multiple compartments include a first compartment for holding a first type of payload that is to be maintained in a first specified temperature range, and a second compartment for holding a second type of payload that is to be maintained in a second specified temperature range.

28. The drone of claim 27, wherein the first compartment includes vents.

29. The drone of claim 27, wherein the first compartment and the second compartment are separated by an insulated wall.

30. The drone of claim 26, wherein the container is built using a plurality of container portions, wherein some of the container portions include fold lines and slots, wherein the container is assembled by folding the container portions along the fold lines and connecting the container portions to each other using the slots.

31. The drone of claim 26, wherein the container includes modular container portions that are adjustable to carry payload of different sizes.

32. The drone of claim 26, wherein the container hood is a conical hood.

33. The drone of claim 26 further comprising:
a container housing that is configured to house the container during the flight of the drone.

34. The drone of claim 33, wherein the container housing is of a conical shape.

35. The drone of claim 33, wherein the container housing is lined with an insulating material on interior walls of the container housing.

36. The drone of claim 26, wherein the container includes an impact absorbing material-based base on which the package to be delivered is placed.

37. The drone of claim 26, wherein the container includes rounded corners.

38. The drone of claim 26, wherein the container is installed with a parachute.

39. The drone of claim 38, wherein the parachute is installed on top of the container, wherein the parachute is folded.

40. The drone of claim 38, wherein the parachute is deployed in an event the suspension means snaps when carrying the container.

41. The drone of claim 38, wherein the parachute is connected to the container at at least three distinct contact points.

42. The drone of claim 1 further comprising:
an application module that is configured to determine a delivery height of the drone, the delivery height being a height at which the drone is to hover for delivering the package.

43. The drone of claim 42, wherein the application module is configured to determine the delivery height as a function of a minimum parachute deployment height.

44. A method comprising:
loading a package onto a drone, wherein the package is locked to a suspension means of the drone using a gravity activated locking mechanism,
wherein the gravitational force exerted on the locking mechanism due to the weight of the package holds the package locked to the suspension means;
determining, by an application module of the drone, that the drone has reached a delivery destination of the package;
lowering, by a package delivery mechanism of the drone, the suspension means to deliver the package at a delivery area in the delivery destination; and
releasing, by the locking mechanism, the package from the suspension means, wherein, when the package rests on the delivery area, the weight of package is off the suspension means, which enables the locking mechanism to automatically rotate and disengage from the package such that the package is released from the suspension means.

\* \* \* \* \*